United States Patent
Maeda et al.

(10) Patent No.: US 7,352,420 B2
(45) Date of Patent: Apr. 1, 2008

(54) LIQUID CRYSTAL DISPLAY AND ELECTRONIC APPLIANCE

(75) Inventors: Tsuyoshi Maeda, Ryuo-cho (JP); Osamu Okumura, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/115,118

(22) Filed: Apr. 27, 2005

(65) Prior Publication Data
US 2005/0195346 A1   Sep. 8, 2005

Related U.S. Application Data

(62) Division of application No. 09/946,594, filed on Sep. 6, 2001, now Pat. No. 6,909,481.

(30) Foreign Application Priority Data
Nov. 7, 2000   (JP) .............................. 2000-339395

(51) Int. Cl.
   *G02F 1/1335* (2006.01)
(52) U.S. Cl. ...................... 349/114; 349/106; 349/113; 349/119; 349/122
(58) Field of Classification Search ................ 349/110, 349/113, 114, 117, 119, 96, 106, 122, 138
   See application file for complete search history.

(56) References Cited

U.S. PATENT DOCUMENTS 6,281,952 B1   8/2001   Okamoto et al.
6,341,002 B1 *  1/2002   Shimizu et al. ............. 349/119
6,611,306 B2   8/2003   Baek
6,628,357 B1   9/2003   Maeda et al. ................ 349/113
6,654,087 B2  11/2003   Song et al.
2002/0003596 A1  1/2002   Kim

FOREIGN PATENT DOCUMENTS

| EP | 0 973 058 A1 | 1/2000 |
| JP | A-5-210099 | 8/1993 |
| JP | A-10-282488 | 10/1998 |
| JP | 11-101992 | 4/1999 |
| JP | 11-109417 | 4/1999 |
| JP | 11-242226 | 9/1999 |
| WO | WO99/40480 | 8/1999 |

* cited by examiner

*Primary Examiner*—Toan Ton
*Assistant Examiner*—Tai Duong
(74) *Attorney, Agent, or Firm*—Oliff & Berridge, PLC

(57) ABSTRACT

The present invention provides a liquid crystal display that can provide a display with high contrast in both the transmissive mode display and the reflective mode display as a transflective liquid crystal display, and an electronic appliance provided therewith. The liquid crystal display can include a liquid crystal layer of a nematic liquid crystal with positive anisotropy of dielectric constant held between a pair of substrates in accordance with the present invention is characterized in that areas used for the display in the liquid crystal layer includes individual areas having at least two kinds of different liquid crystal layer thickness, the individual areas of different liquid crystal layer thickness are either a reflective display unit or a transmissive display unit, a reflective means is disposed on the reflective display unit, and a transparent resin layer is formed in a portion except a portion corresponding to the transmissive display unit.

9 Claims, 15 Drawing Sheets

[FIG. 1]
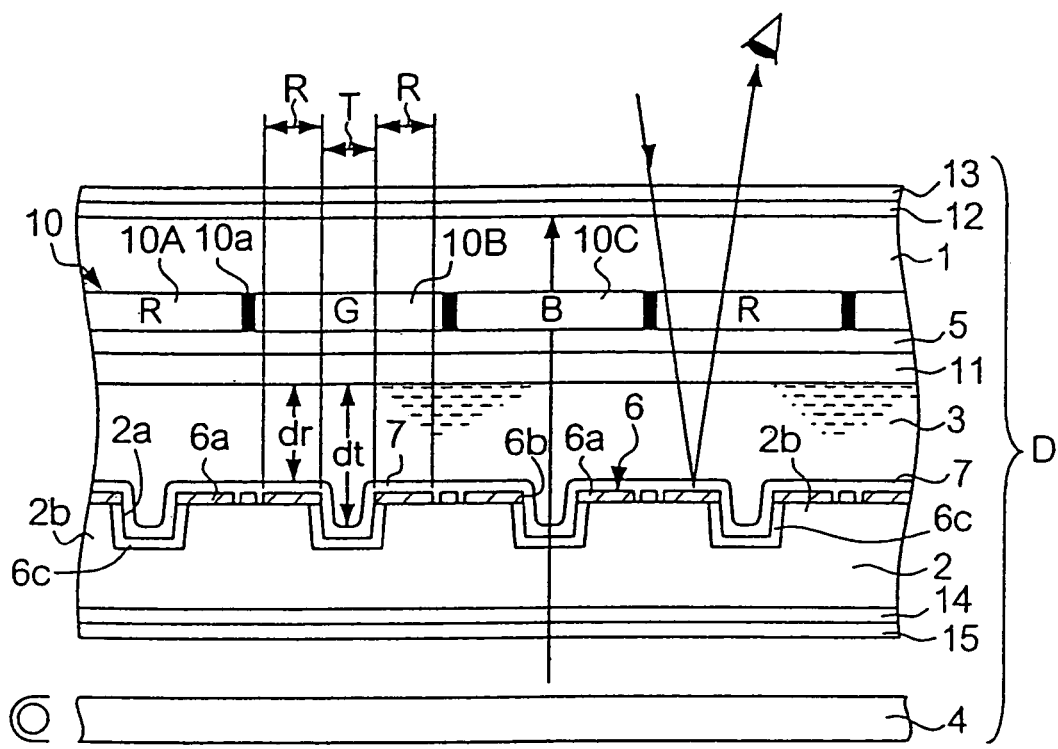
[FIG. 2]
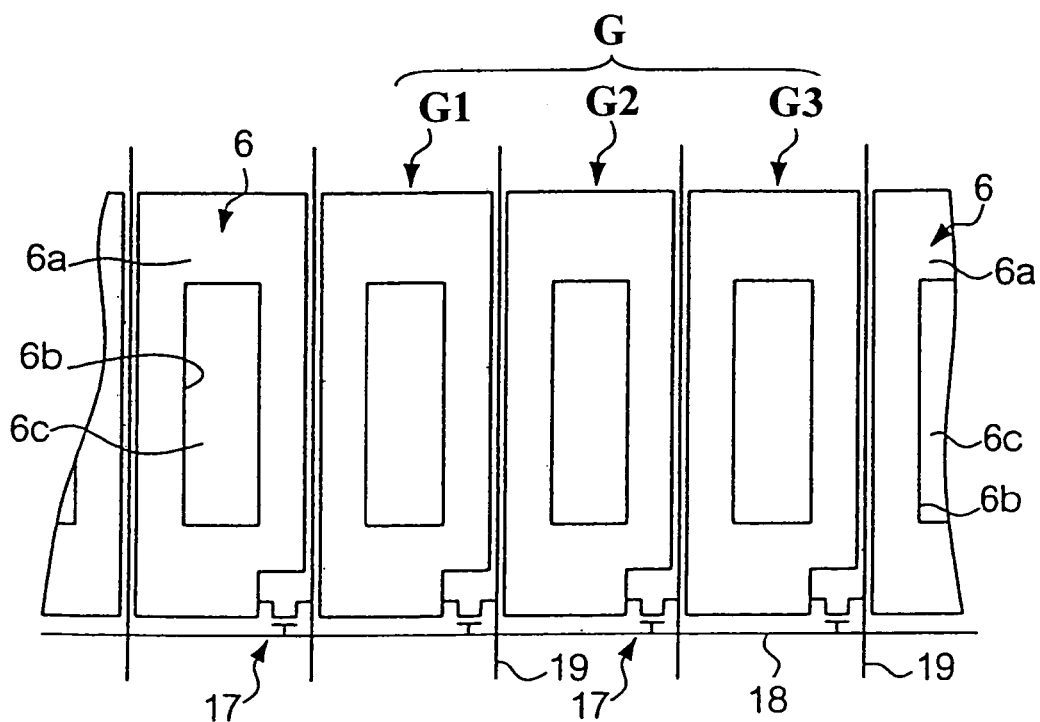

[FIG. 3]
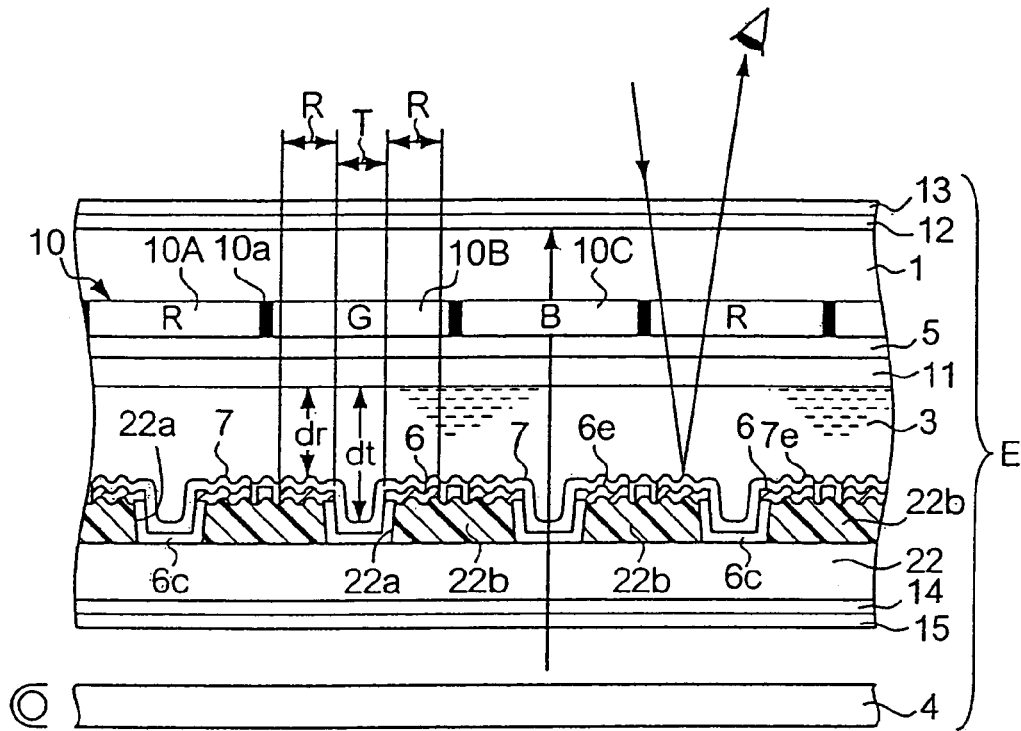
[FIG. 4]
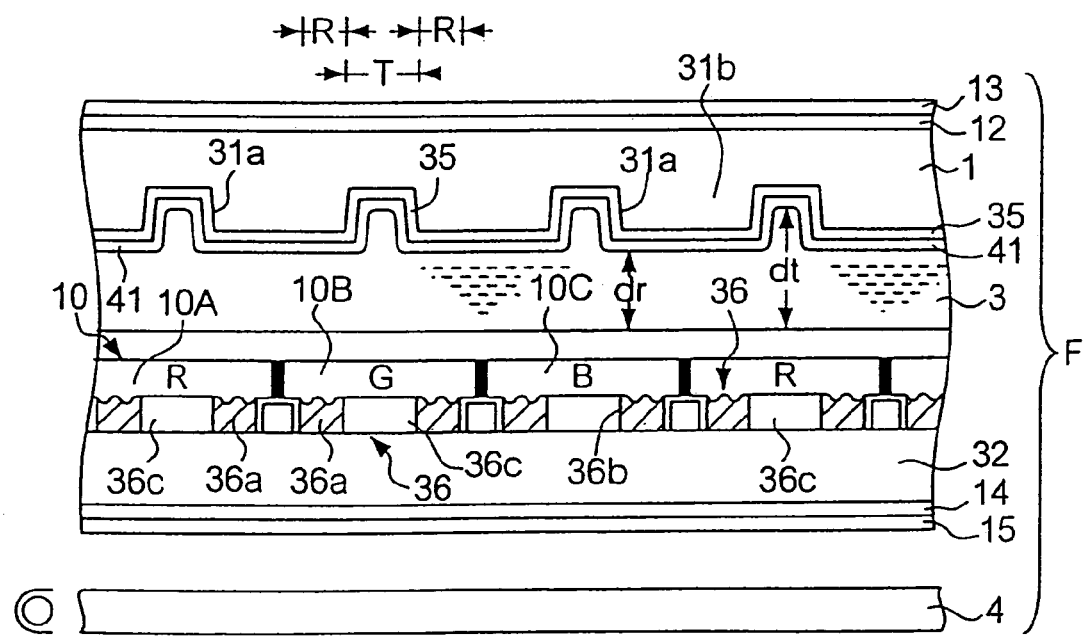

[FIG. 5]
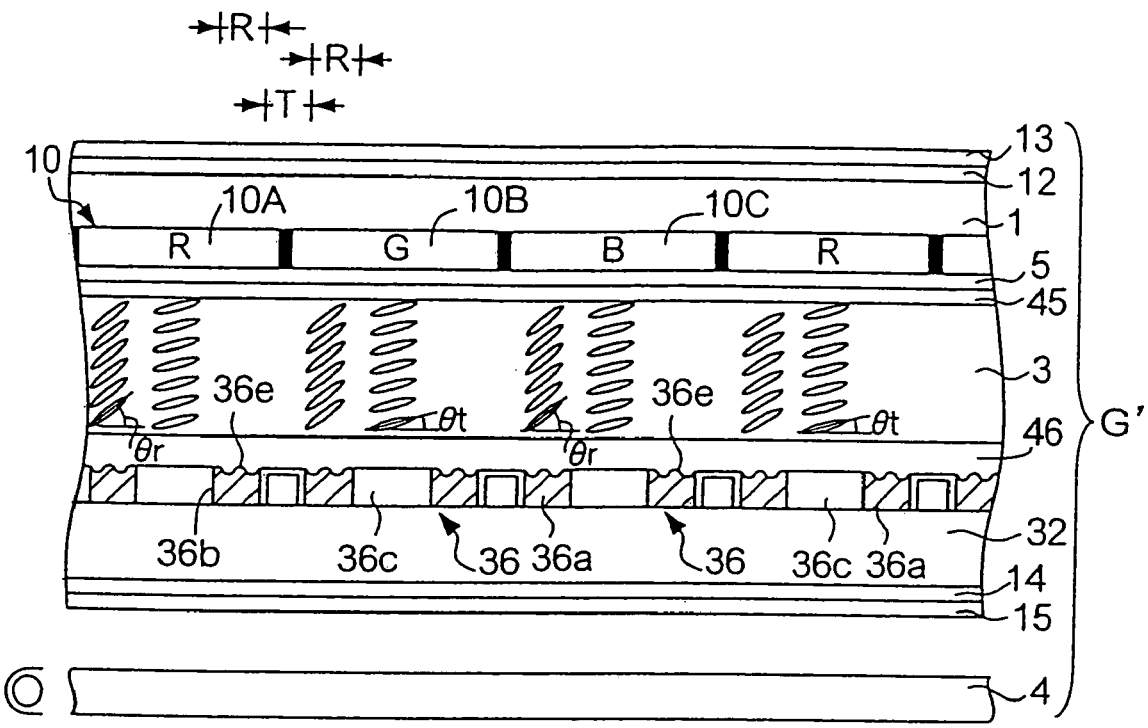
[FIG. 6]
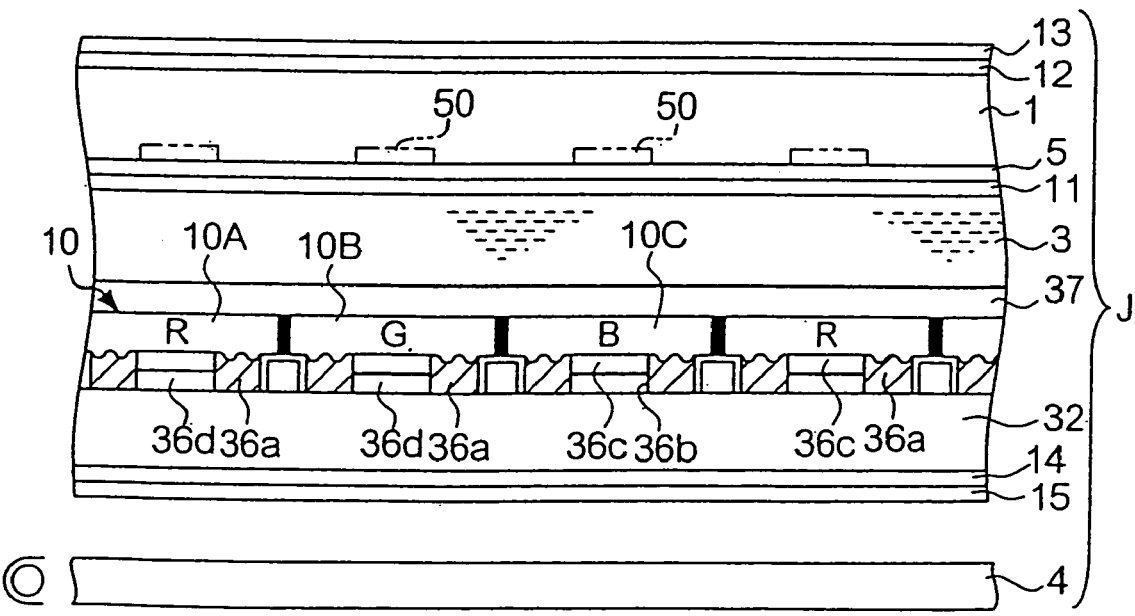

[FIG. 7]
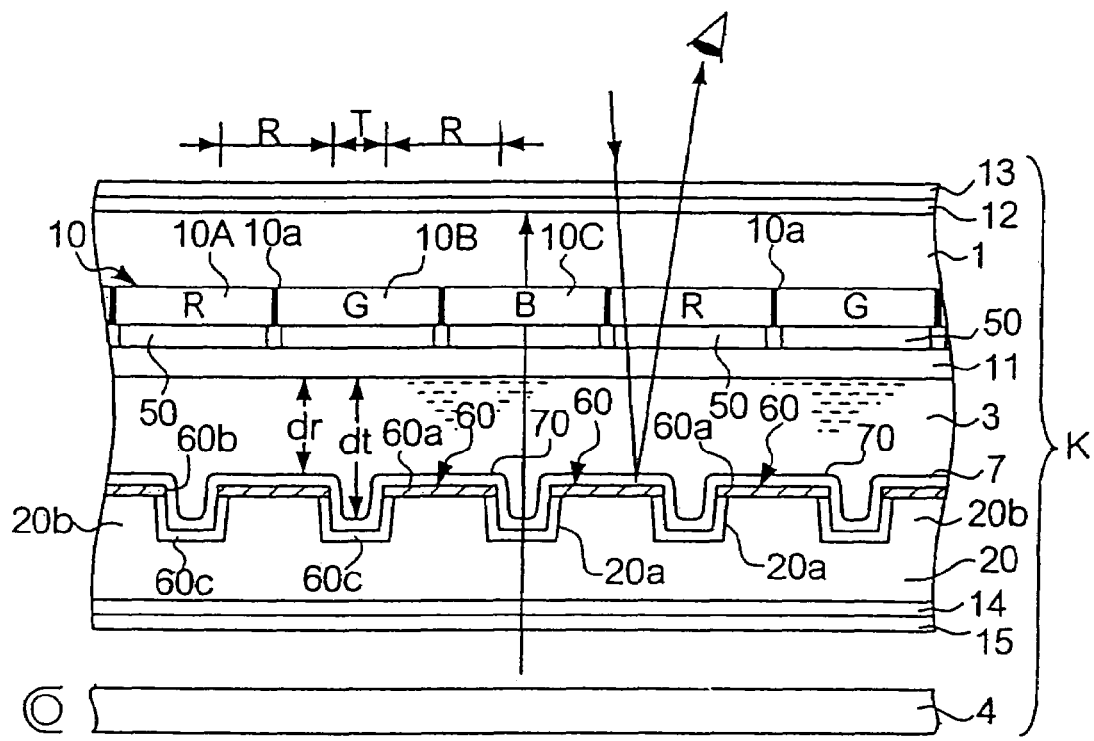
[FIG. 8]
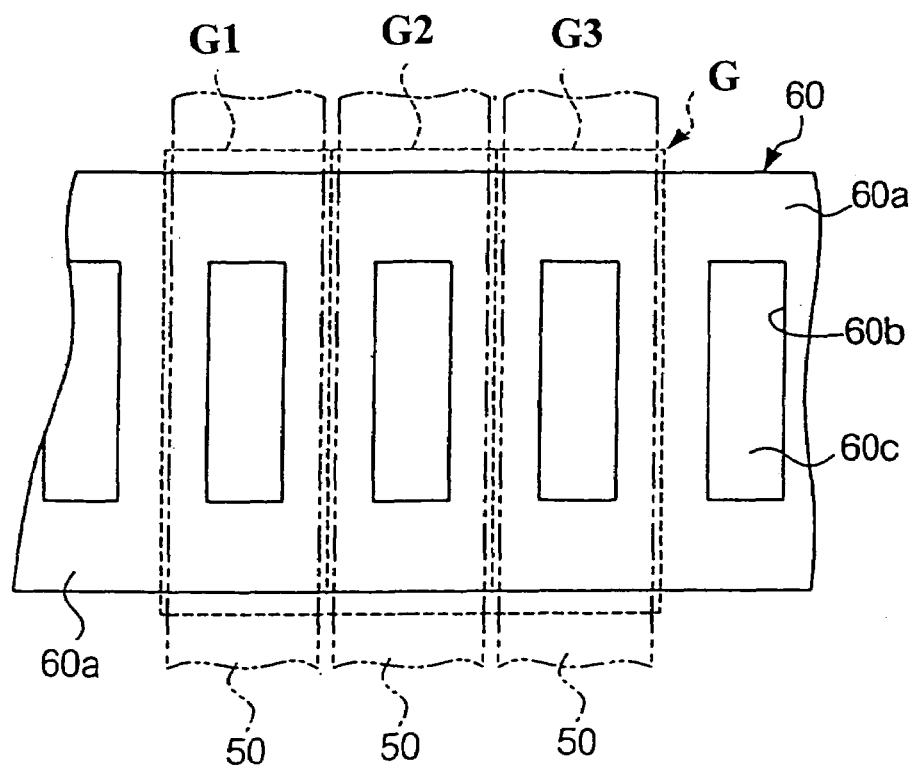

[FIG.9]
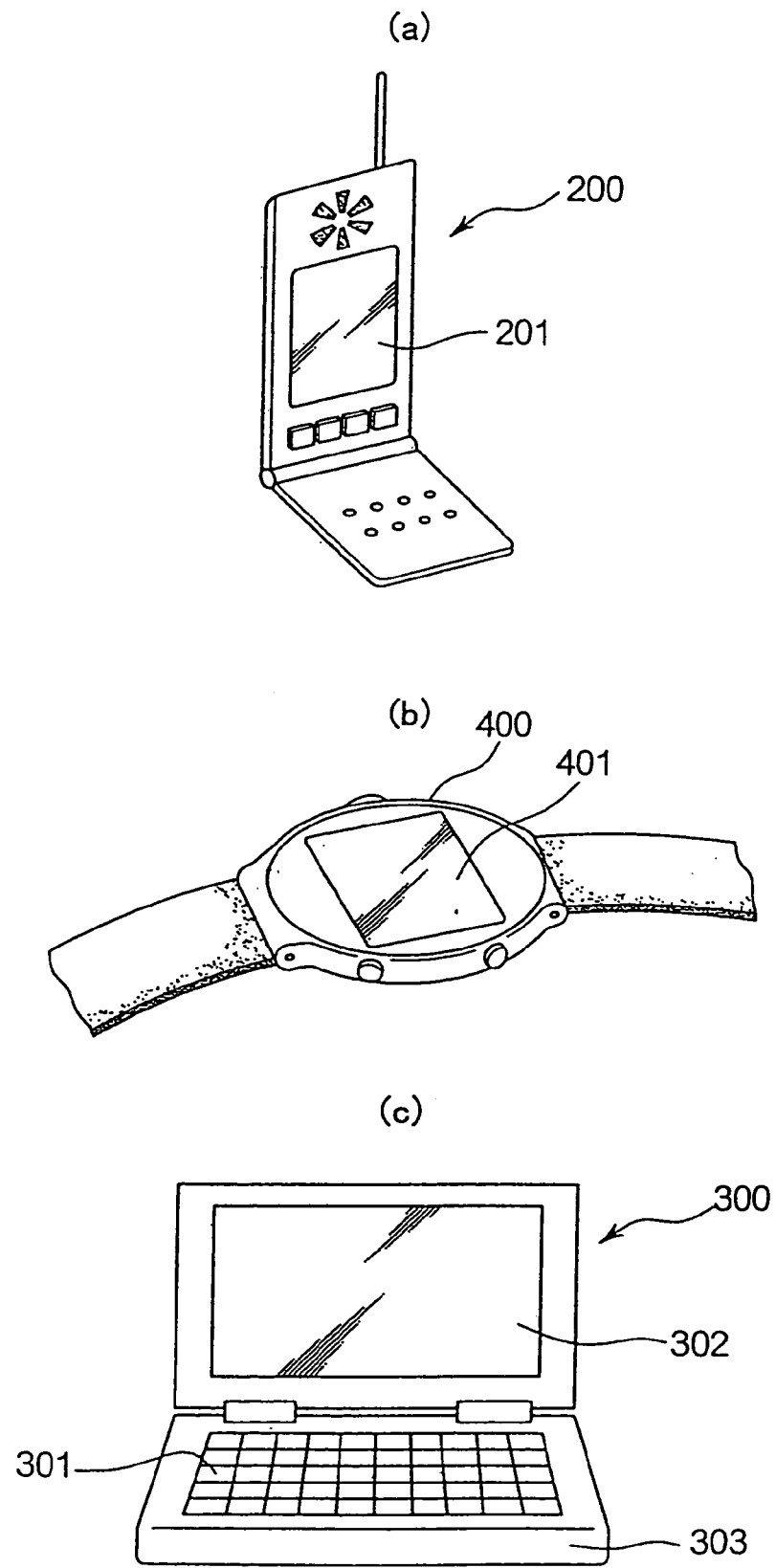

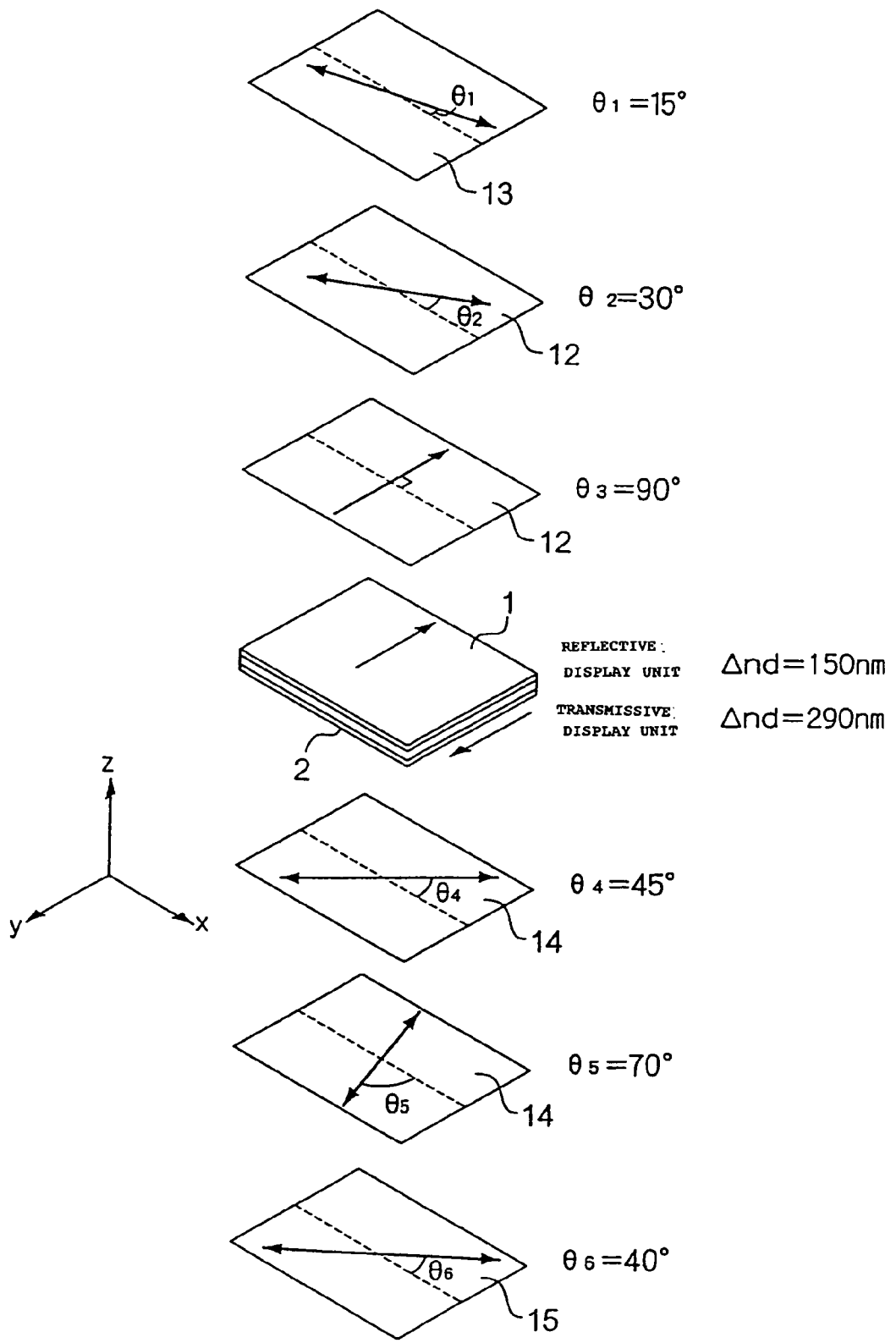
[FIG. 10]

[FIG. 11]
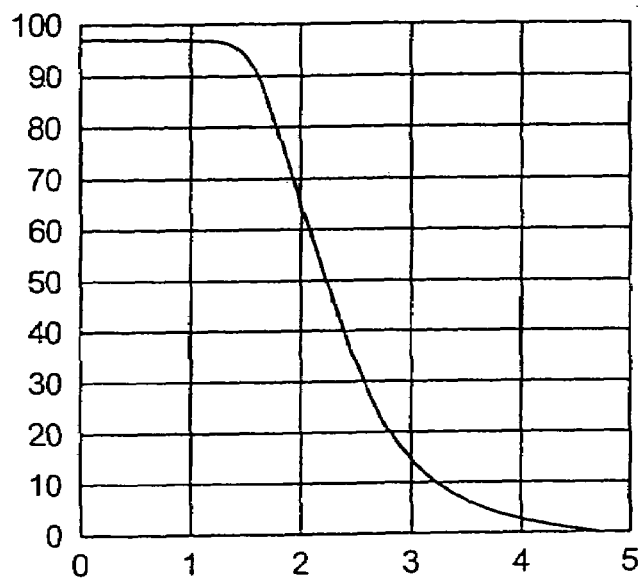
[FIG. 12]
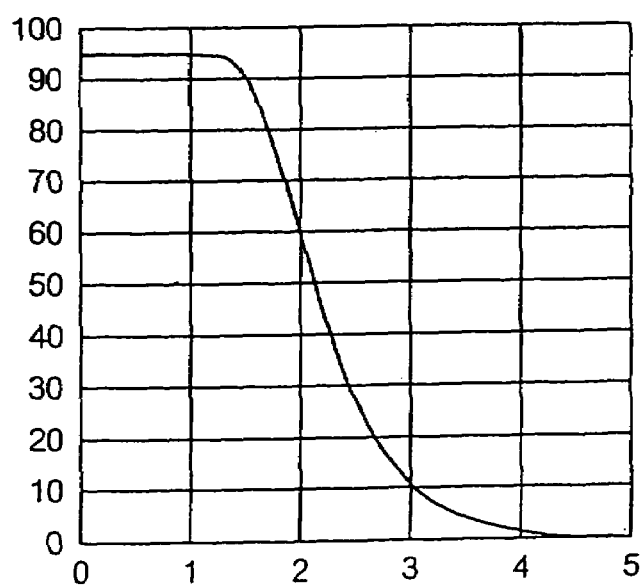

[FIG. 13]
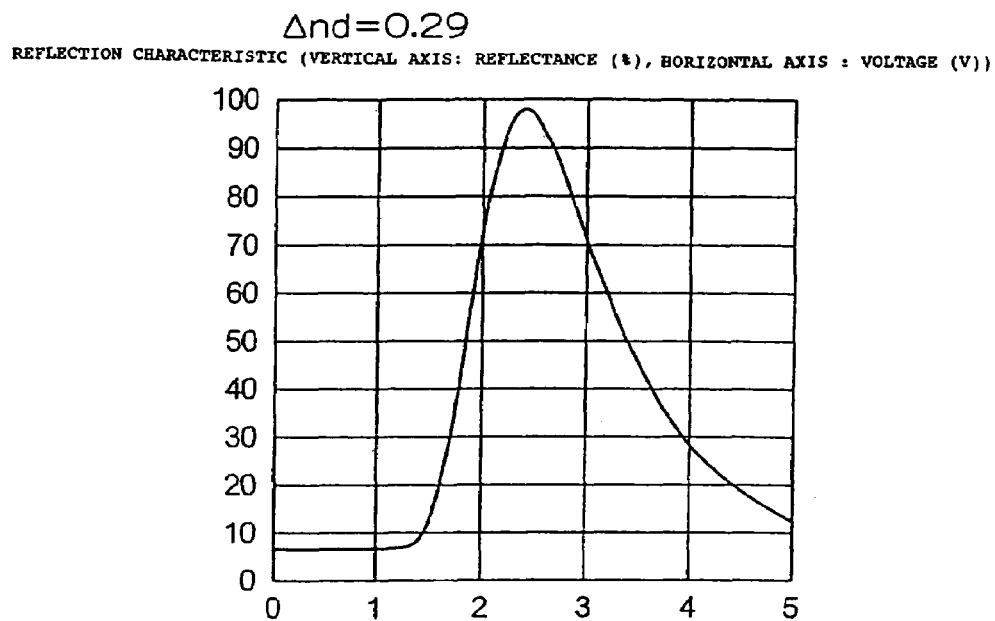
[FIG. 14]
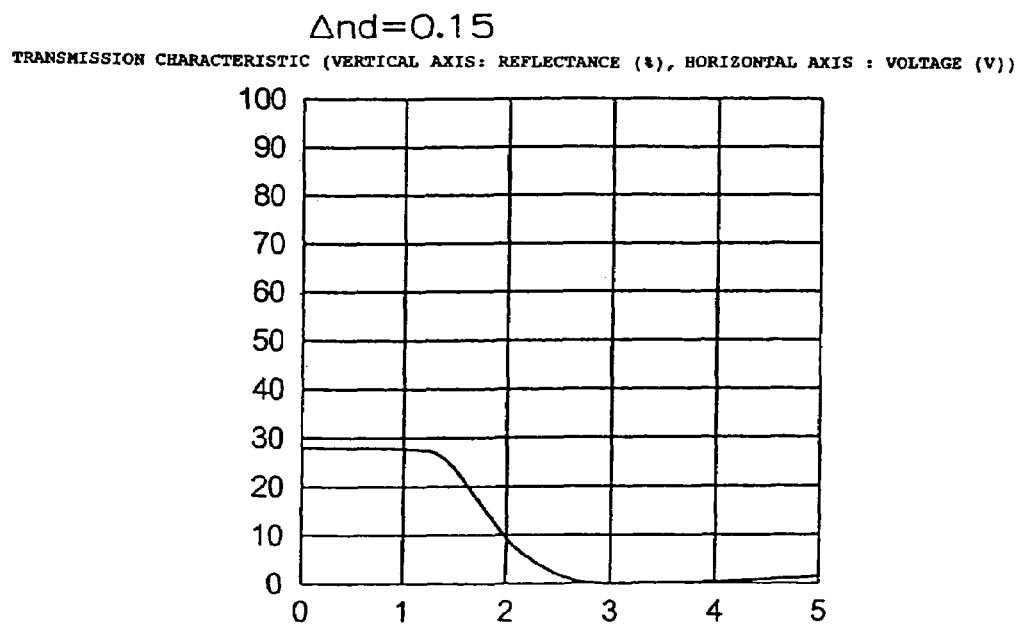

[FIG. 15]
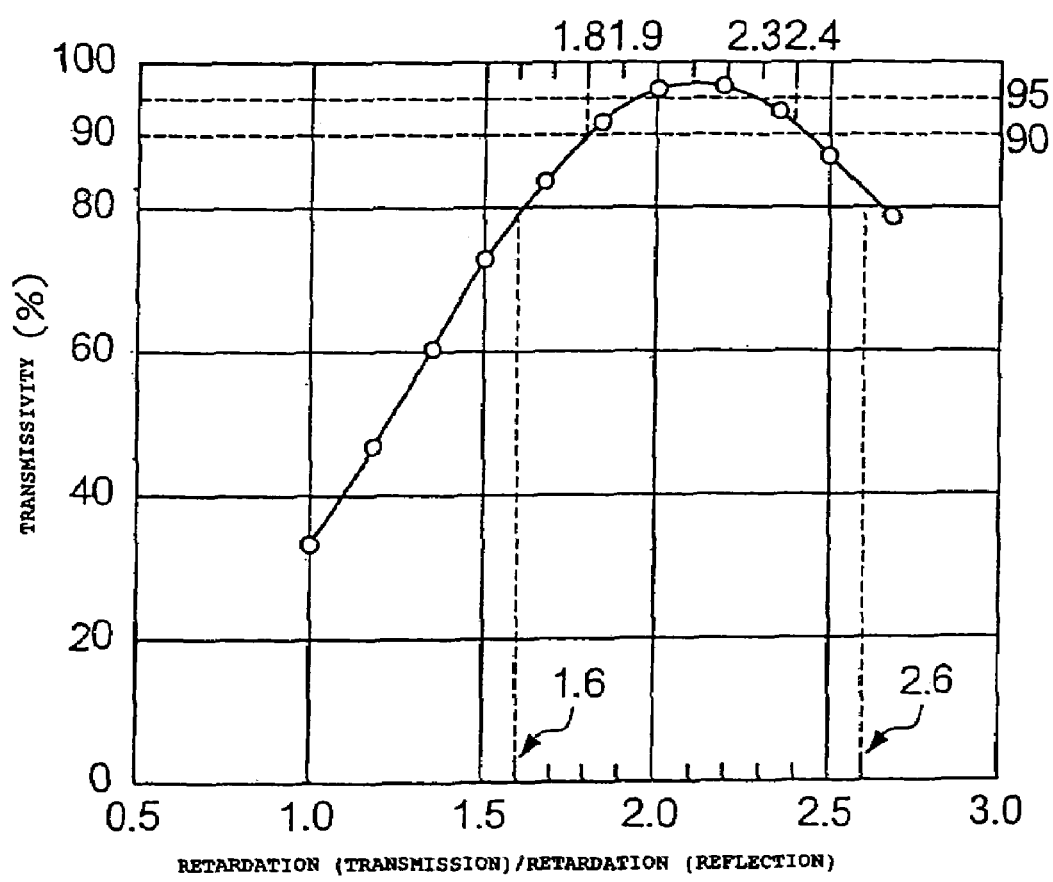

[FIG. 16]
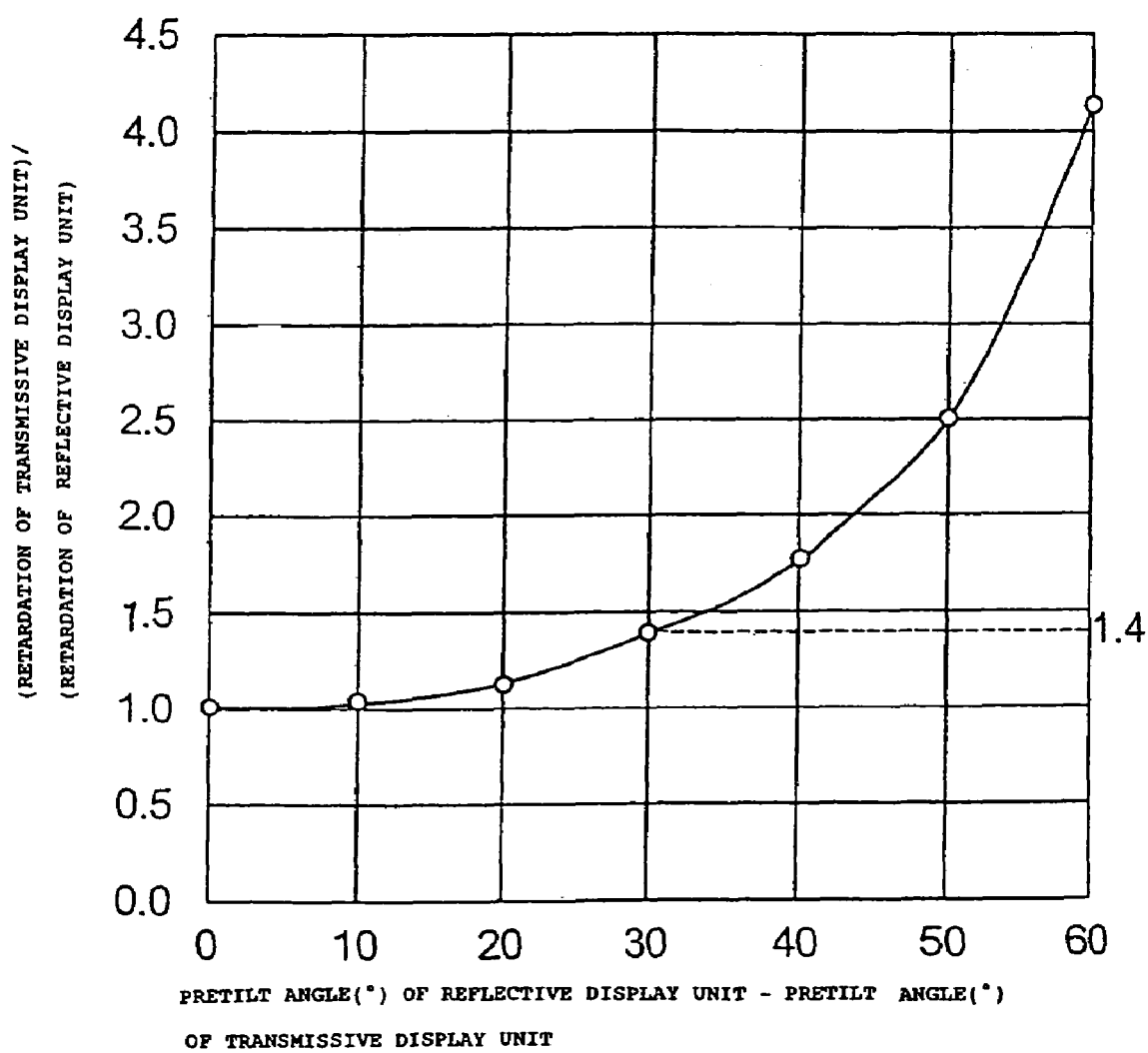

[FIG. 17]
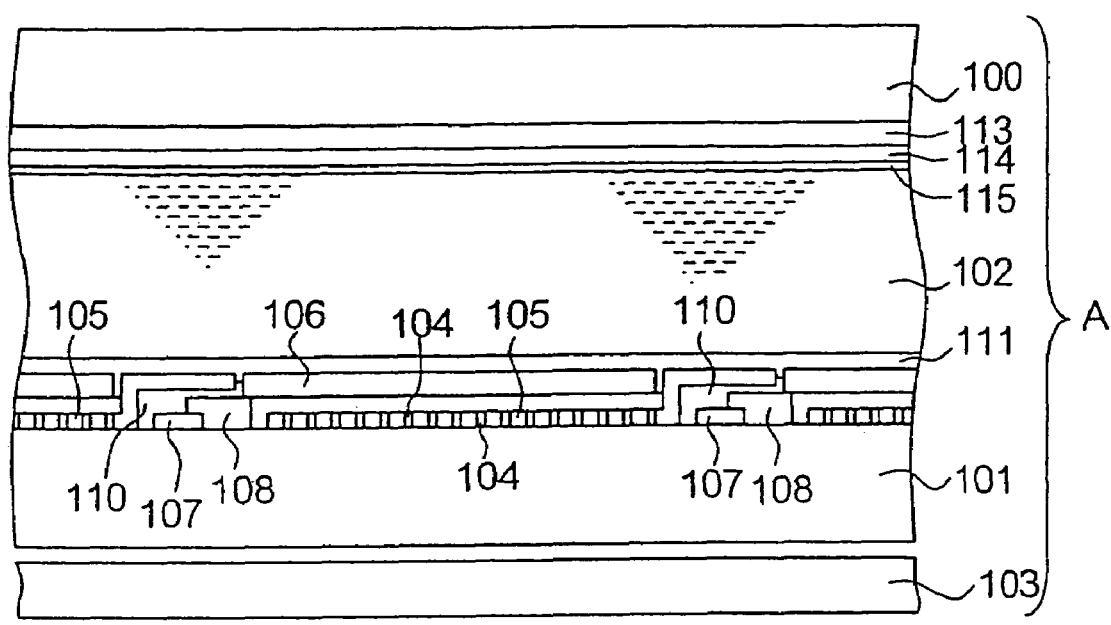

[FIG. 18]
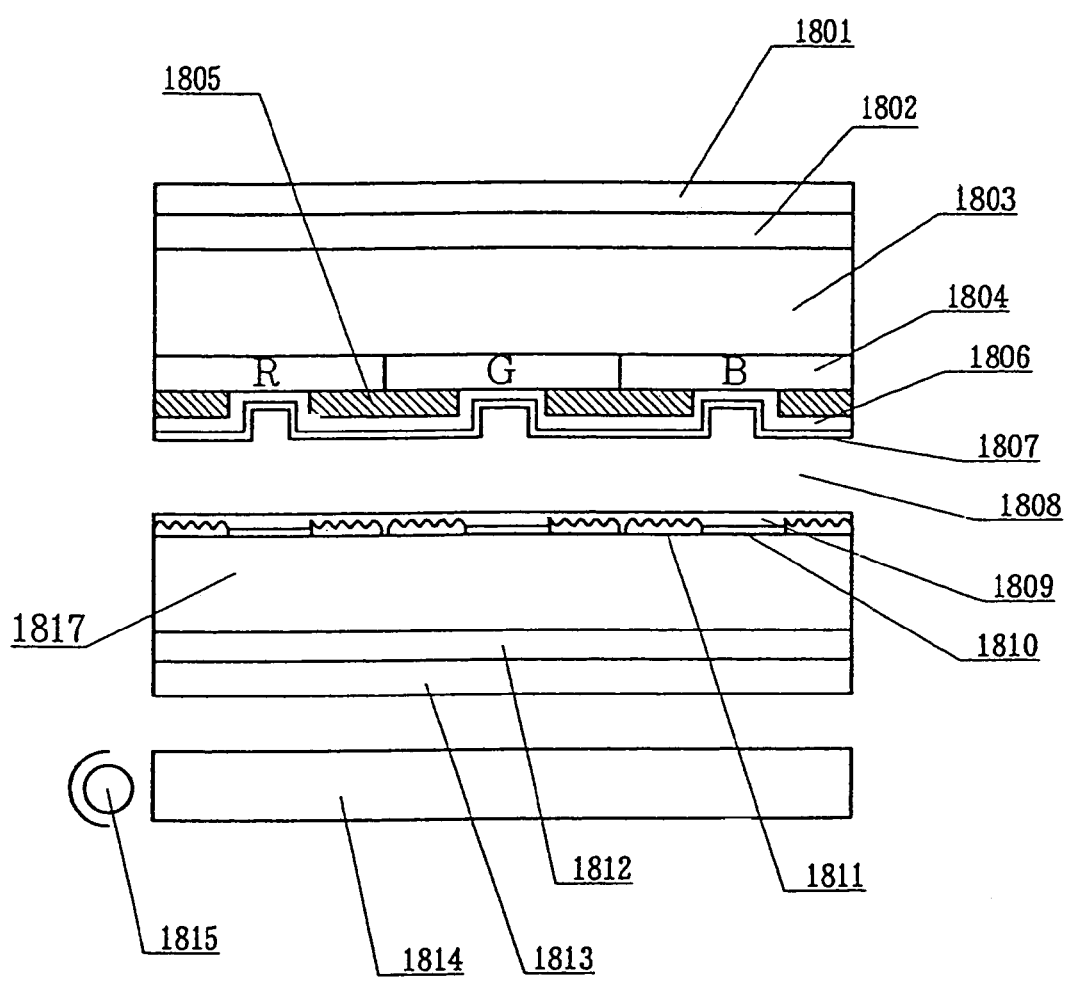

[FIG. 19]
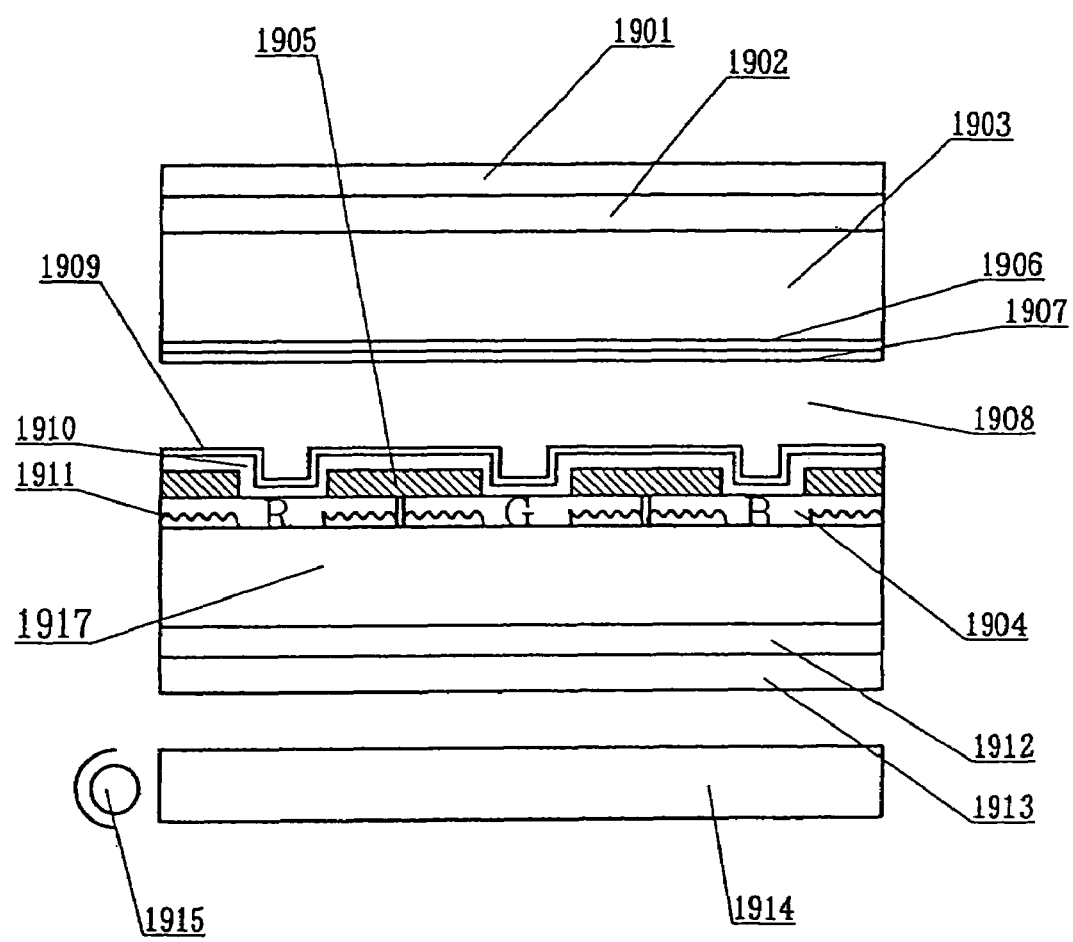

[FIG. 20]
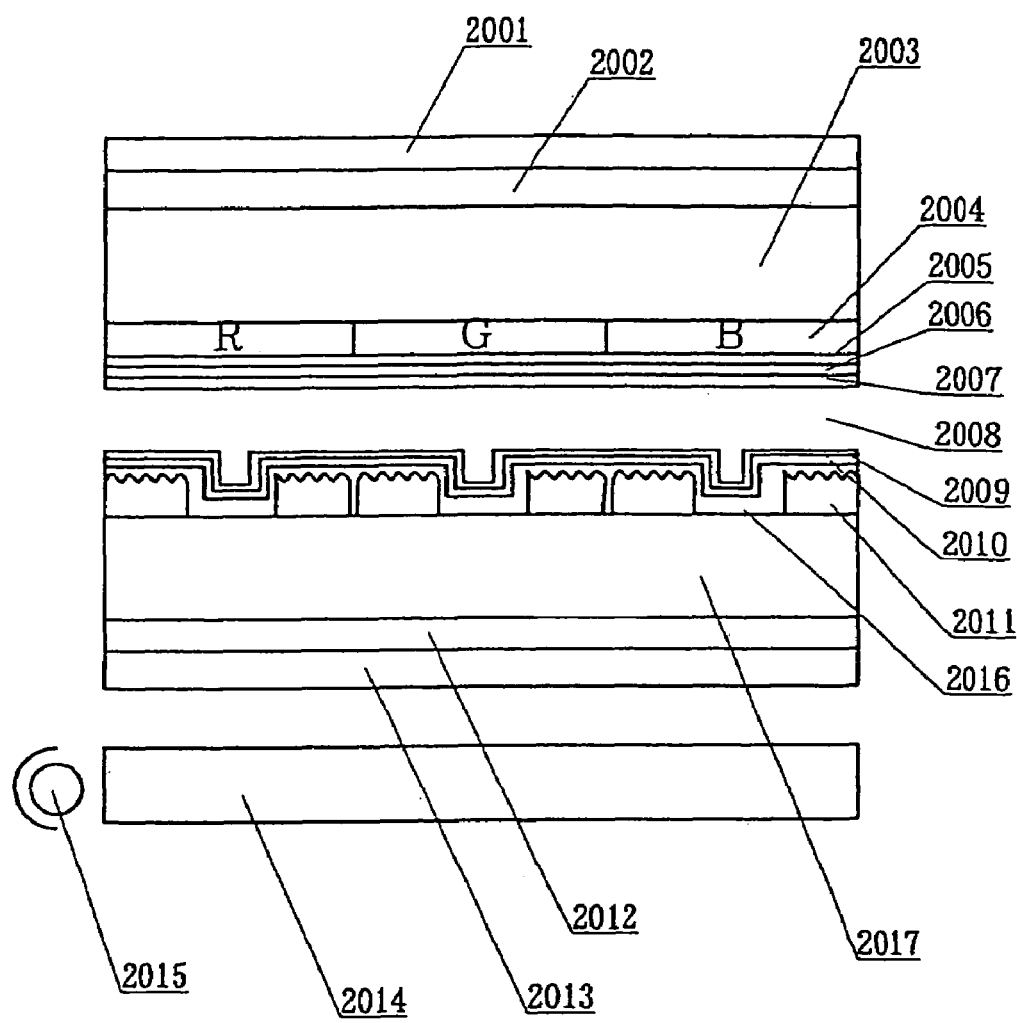

[FIG. 21]
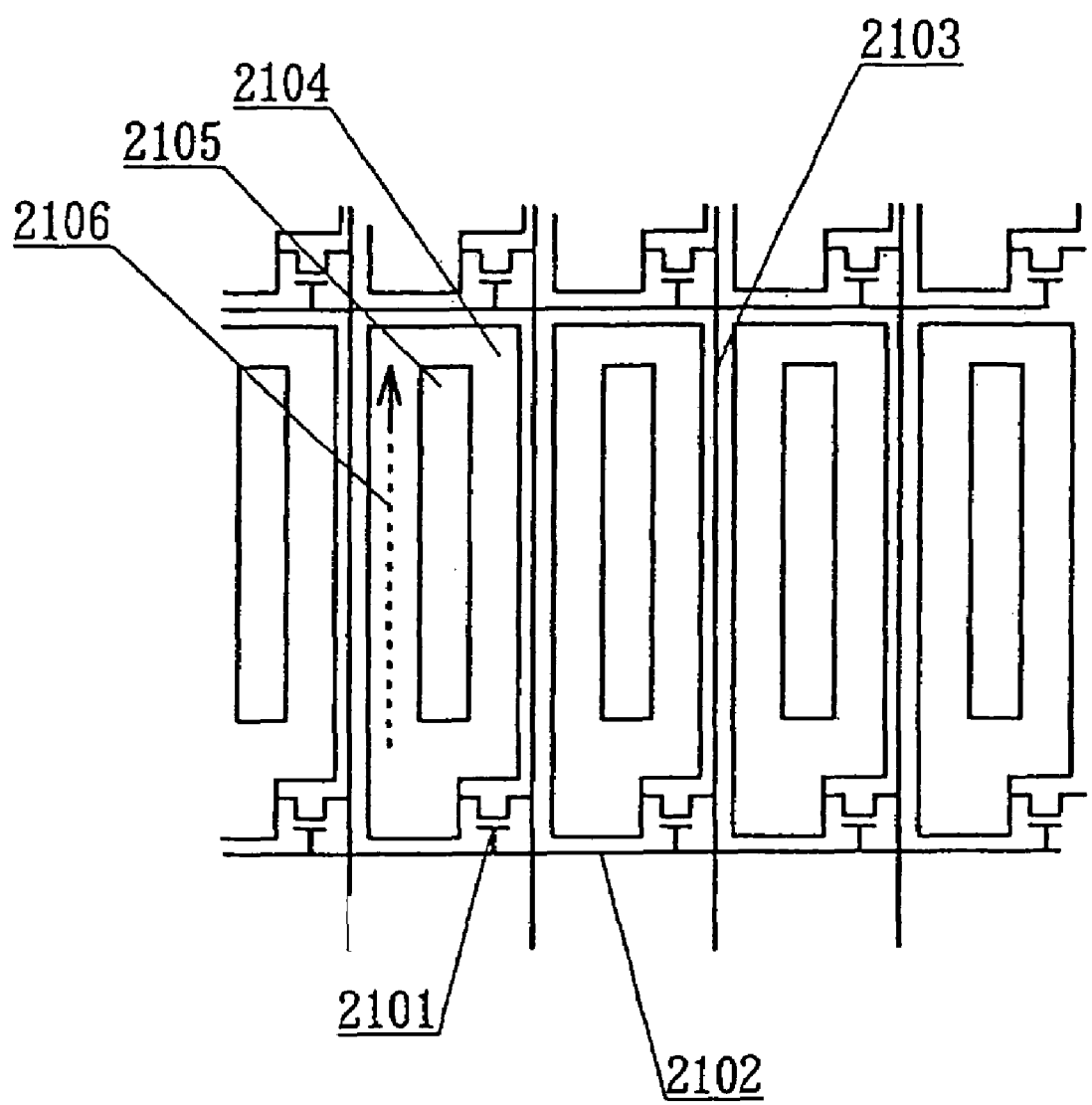

LIQUID CRYSTAL DISPLAY AND ELECTRONIC APPLIANCE

This is a Division of application Ser. No. 09/946,594 filed Sep. 6, 2001 now U.S. Pat. No. 6,909,481. The entire disclosure of the prior application is hereby incorporated by reference herein in its entirety.

BACKGROUND

The present invention relates to a liquid crystal display having a pair of substrates holding a liquid crystal layer and an electronic appliance including the liquid crystal display. More particularly, the present invention relates to the technology of obtaining a bright display with high contrast by providing both a transmissive display unit and a reflective display unit.

Currently, liquid crystal displays having small power consumption have been extensively used for a display unit in various kinds of electronic appliances, such as notebook personal computers, portable game machines and electronic notebooks. Particularly, in recent years, demand for a liquid crystal display capable of displaying color has increased as the display contents are diversified. In particular, the liquid crystal displays include the reflective structure type and the transmissive structure type according to the service applications.

A transmissive liquid crystal display has a structure with a backlight to improve visibility in dark places. However, with the transmissive liquid crystal displays the visibility is degraded in an environment in which external light brighter than the backlight is present, such as outdoors. Further, the power consumption is also high.

A reflective liquid crystal display has a display structure whereby external light is reflected by a reflector, and therefore, no backlight is required. This has the advantage of low power consumption, however, the visibility is degradable in dark places where the external light is weak.

A transflective liquid crystal display has been provided as a structure having both the advantages of a conventional transmissive liquid crystal display and a conventional reflective liquid crystal display. FIG. 17 shows an example of this kind of the conventional transflective liquid crystal display as disclosed in Japanese Unexamined Patent Application Publication No. 10-282488. In a basic structure of a transflective liquid crystal display A in this example, a liquid crystal layer 102 is held between upper and lower glass substrates 100 and 101, and a backlight unit 103 is provided outside the lower glass substrate 101. A plurality of reflectors 105 having a plurality of small holes 104 for light transmission are intermittently formed on an upper surface on the liquid crystal side of the lower glass substrate 101. A liquid crystal drive electrode 106 formed of a transparent conductive material is formed to cover most of the reflectors 105. A wiring pattern 107 and a TFT (thin film transistor element) 108 to drive each liquid crystal drive electrode 106 are formed on the substrate 101. A part of the reflectors 105 are extended onto the wiring pattern 107 and the TFT element 108 via an insulating film 110, and an alignment layer 111 is formed covering the reflectors 105 and the liquid crystal control electrodes 106. A color filter 113, an opposing electrode 114 and an alignment layer 115 are laminated on a surface on the liquid crystal layer 102 side of the upper glass substrate 100. In the structure shown in FIG. 18, a retardation film and a polarizer are appropriately disposed outside the glass substrates 100 and 101, however, they are omitted in FIG. 17.

In the transflective liquid crystal display A of the structure shown in FIG. 17, the light incident from the external side of the liquid crystal display is transmitted through the glass substrate 100, the color filter 113, the opposing electrode 114, the alignment layer 115, the liquid crystal layer 102, the alignment layer 111, and the liquid crystal drive electrode 106, and is reflected by the reflectors 10S, and transmitted again through the liquid crystal drive electrode 106, the alignment layer 111, the liquid crystal layer 102, the alignment layer 115, the transparent electrode 114, the color filter 113, and the glass substrate 100, and reaches the naked eye of a viewing person. The color display can be achieved because the alignment-controlled liquid crystal layer 102 controls the transmissivity of the light reflected by the reflectors 105. The light generated by the backlight unit 103 is transmitted through the hole 104 for light transmission, and then, the liquid crystal drive electrode 106, the alignment layer 111, the liquid crystal layer 102, the alignment layer 115, the opposing electrode 114, the color filter 113 and the glass substrate 100, and reaches the naked eye of the viewing person, and the color display can be achieved because the alignment-controlled liquid crystal layer 102 controls the transmissivity of the light.

The transflective liquid crystal display A shown in FIG. 17 can realize the transmissive display making use of the transmitted light from the backlight 103 and the reflective display making use of the external light by one liquid crystal display.

SUMMARY

In the transflective liquid crystal display A shown in FIG. 17, the retardation $\Delta$nd of the liquid crystal of a portion to achieve the reflective liquid crystal display is given by 2×$\Delta$nd. This is because the incident light is transmitted through the liquid crystal layer 102 twice, and then, reaches the viewing person. The retardation $\Delta$nd of the liquid crystal of the portion to achieve the transmissive liquid crystal display is given by 1×$\Delta$nd because the incident light from the backlight 103 is transmitted through the liquid crystal layer 102 only once, where d is the thickness of the liquid crystal layer, $\Delta$n is the anisotropy of refractive index of the liquid crystal, and $\Delta$nd is the retardation of the liquid crystal indicated as the product thereof.

When the alignment of the liquid crystal molecule of the liquid crystal layer 102 is controlled in a structure in which the retardation value is different in the portion to achieve the reflective liquid crystal display and in the portion to achieve the transmissive liquid crystal display, the alignment is controlled by applying the electric field to the liquid crystal at the same drive voltage from the transparent electrode 104 and the reflective electrode 105. However, a display with high contrast cannot be obtained because of the alignment of the liquid crystal in the different mode display in the liquid crystal. In other words, in the different retardation state in the transmissive display area and the reflective display area is controlled by the same drive voltage, and a problem occurs, in that a bright display is difficult to obtain.

Accordingly, the present invention has been made in light of the above problem and one of the objects of the present invention is to provide a liquid crystal display which can obtain a bright display state with high contrast making effective use of the transmitted light when the transmitted light of the backlight is used as the transflective liquid crystal display. Further, an object of the present invention is to obtain a bright display state with high contrast by making effective use of the external light when the external light is used as the reflective liquid crystal display.

The present invention has been made in light of the above problem and other objects of the present invention are to provide a liquid crystal display which can obtain a bright mode display with high contrast in both the transmissive display and the reflective display by realizing the structure for controlling the alignment of the liquid crystal after making adjustment so that a portion for the transmissive display and a portion for the reflective display are close to each other in retardation.

In addition, still another object of the present invention is to eliminate any defective alignment generated in a boundary between a transmissive display unit and a reflective display unit.

A reflective liquid crystal display in accordance with the present invention can include a liquid crystal layer of a nematic liquid crystal with positive anisotropy of dielectric constant held between a pair of substrates. Areas used for the display in the liquid crystal layer can include individual areas having at least two kinds of different liquid crystal layer thickness, the individual areas different in the liquid crystal layer thickness have either a reflective display unit or a transmissive display unit. A reflective layer is disposed on the reflective display unit, the thickness of the liquid crystal layer corresponding to the reflective display unit is set to be smaller than the thickness of the liquid crystal layer corresponding to the transmissive display unit, and the inequalities $1.8 \times dh \leq dt \leq 2.4 \times dh$ are satisfied, where $dh$ is the thickness of the liquid crystal layer corresponding to the reflective display unit, and $dt$ is the thickness of the liquid crystal layer corresponding to the transmissive display unit.

If the thickness of the liquid crystal layer corresponding to the reflective display unit and the thickness of the liquid crystal layer corresponding to the transmissive display unit are set to satisfy the inequalities $1.8 \times dh \leq dt \leq 2.4 \times dh$, the transmissivity of the liquid crystal of the area of the reflective display and the transmissivity of the liquid crystal of the area of the transmissive display can be arranged, and a display state with high contrast can be maintained at the reflective display unit and the transmissive display unit.

In the present invention, a plurality of electrodes for driving the liquid crystal layer in the display area are formed on the liquid crystal layer side of the substrate, and individual divided pixel areas driven by each electrode preferably include areas having at least two kinds of different liquid crystal layer thickness.

In such a structure, when each electrode controls the alignment of the liquid crystal, the reflective display unit and the transmissive display unit can be separately used in a small area, and the display with high contrast can be obtained when the reflective display unit is used separately from the transmissive display unit.

In the present invention, the inequalities of $1.8 \Delta ndh \leq \Delta ndt \leq 2.4 \Delta ndh$ are preferably satisfied, where $\Delta n$ is the anisotropy of refractive index of the liquid crystal to constitute the liquid crystal layer, $\Delta ndh$ is the product of the anisotropy of refractive index by the thickness $dh$ of the liquid crystal layer of the reflective display unit, and $\Delta ndt$ is the product of the anisotropy of refractive index by the thickness $dt$ of the liquid crystal layer of the transmissive display unit.

If the thickness of the liquid crystal layer corresponding to the reflective display unit and the thickness of the liquid crystal layer corresponding to the transmissive display unit are set to satisfy the inequalities $1.8 \Delta ndh \leq \Delta ndt \leq 2.4 \Delta ndh$, the transmissivity of the liquid crystal of the area of the reflective display and the transmissivity of the liquid crystal of the area of the transmissive display can be arranged, and a display state with reliably high contrast can be maintained at the reflective display unit and the transmissive display unit.

In addition, the present invention is characterized in that recessed portions facing the liquid crystal layer of the transmissive display unit are formed on the other substrate facing the substrate having the reflective layer, and the thickness of the liquid crystal layer corresponding to the reflective display unit is set to be smaller than the thickness of the liquid crystal layer corresponding to the transmissive display unit.

In the liquid crystal display of the present invention including the liquid crystal layer held between a pair of the substrates, the area used for the display in the liquid crystal layer having the transmissive display unit and the reflective display unit having at least two kinds of different pretilt angle. A reflective layer is disposed on the reflective display unit, the pretilt angle of the area corresponding to the reflective display unit is set to be larger than the pretilt angle of the area corresponding to the transmissive display unit, and a structure to satisfy the inequalities $30° \leq \theta h - \theta t \leq 50°$ may be employed, where $\theta h$ is the pretilt angle of the liquid crystal layer corresponding to the reflective display unit and $\theta t$ is the pretilt angle of the liquid crystal layer corresponding to the transmissive display unit.

In the liquid crystal display including the liquid crystal layer held between a pair of the substrates, a structure characterized in that the area used for the display in the liquid crystal layer includes the reflective display unit and the transmissive reflective display unit having at least two kinds of different retardation, and a retardation layer is formed only in the transmissive display unit, may be used.

In the configuration of the present invention, a plurality of electrodes to control the alignment of the liquid crystal of the liquid crystal layer may be disposed corresponding to the pixels of the display area of the liquid crystal layer, and individual electrodes to apply the electric field to the liquid crystal corresponding to each pixel may include a reflective electrode unit and a transmissive electrode unit. If the transmissive display unit and the reflective display unit are disposed for each pixel, even a highly precise liquid crystal panel can be used for the highly precise display by switching the transmissive display unit and the reflective display unit.

The liquid crystal display in accordance with the present invention is characterized in that the liquid crystal display includes the liquid crystal layer of a nematic liquid crystal with positive anisotropy of dielectric constant held between a pair of the substrates. Areas used for the display in the liquid crystal layer include individual areas having at least two kinds of different liquid crystal layer thickness, the individual areas of different liquid crystal layer thickness are either the reflective display unit or the transmissive display unit. A reflective layer is disposed on the reflective display unit, and a transparent resin layer is formed on a portion except a portion corresponding to the transmissive display unit.

By doing so, a liquid crystal display having thickness of the liquid crystal layer of the transmissive display unit that is larger than that of the reflective display unit can be realized by the transparent resin layer. The transmissivity of the liquid crystal in the area in the reflective mode display and the transmissivity of the liquid crystal in the area in the transmissive mode display can be arranged, and a display state with high contrast can be maintained at the reflective display unit and the transmissive display unit. The transparent resin layer can be easily formed of an acrylic resin. In addition, the transparent resin layer may be formed of a protective film of a color filter. The resin layer gives no adverse effect (degradation in coloring and brightness) on the reflective display so long as it is transparent to the light in the visible light range.

The liquid crystal layer in accordance with the present invention is characterized in that the liquid crystal display includes a liquid crystal layer of the nematic liquid crystal with positive anisotropy of dielectric constant held between a pair of substrates. Areas used for the display in the liquid crystal layer include individual areas having at least two kinds of different liquid crystal layer thickness. The individual areas of different liquid crystal layer thickness is either the reflective display unit or the transmissive display unit. A reflective device is disposed on the reflective display unit, the thickness of the liquid crystal layer corresponding to the reflective display unit is set to be smaller than the thickness of the liquid crystal layer corresponding to the transmissive display unit, and the voltage is applied to the liquid crystal of the reflective display unit and the transmissive display unit constantly by the transparent electrode of the same material.

In this device, a boundary between the transmissive display unit and the reflective display unit is continuously connected via a transparent electrode of the same material, and the boundary portion has a gentle slope. The defective alignment generated in a step between the reflective display unit and the transmissive display unit can be suppressed to a minimum, and both the reflective display unit and the transmissive display unit can be maintained in the display state with high contrast. Further, the voltage is applied to the liquid crystal layer constantly by the transparent electrode of the same material, and no difference in polarity (no potential difference) is caused between dissimilar materials. Defective displays, such as flickers and afterimages, can be eliminated thereby, and a display state with high contrast can be maintained at both the reflective display unit and the transmissive display unit.

The liquid crystal display in accordance with the present invention is characterized in that the liquid crystal display includes the liquid crystal layer of the nematic liquid crystal with positive anisotropy of dielectric constant held between a pair of substrates. Areas used for the display in the liquid crystal layer include individual areas having at least two kinds of different liquid crystal layer thickness, the individual areas of different liquid crystal layer thickness are either the reflective display unit or the transmissive display unit. The reflective layer is disposed on the reflective display unit, the thickness of the liquid crystal layer corresponding to the reflective display unit is set to be smaller than the thickness of the liquid crystal layer corresponding to the transmissive display unit, the transmissive display unit is of a rectangular shape, and the longitudinal direction of the rectangular shape is substantially parallel to the alignment direction of the liquid crystal alignment layer.

Using this device, the defective alignment caused in the step between the reflective display unit and the transmissive display unit can be suppressed to a minimum, and a display state with high contrast can be maintained both at the reflective display unit and the transmissive display unit.

An electronic appliance in accordance with the present invention is characterized in that the liquid crystal display according to any one of the aspects of the invention is disposed in a display unit. The display with high contrast in both the transmissive mode display and the reflective mode display can be obtained in these electronic appliances.

BRIEF DESCRIPTION OF THE DRAWINGS

The invention is described in detail with reference to the following figures, wherein like numerals reference like elements, and wherein:

FIG. 1 is a cross-sectional view of a first embodiment of a transflective liquid crystal display in accordance with the present invention;

FIG. 2 is a plan view of an electrode shape of the structure according to the first embodiment shown in FIG. 1;

FIG. 3 is a cross-sectional view of a second embodiment of a transflective liquid crystal display in accordance with the present invention;

FIG. 4 is a cross-sectional view of a third embodiment of a transflective liquid crystal display in accordance with the present invention;

FIG. 5 is a cross-sectional view of a fourth embodiment of a transflective liquid crystal display in accordance with the present invention;

FIG. 6 is a cross-sectional view of a fifth embodiment of a transflective liquid crystal display in accordance with the present invention;

FIG. 7 is a cross-sectional view of a sixth embodiment of a transflective liquid crystal display in accordance with the present invention;

FIG. 8 is a plan view of an electrode shape of the structure according to the fifth embodiment shown in FIG. 7;

FIG. 9 shows an example of an electron appliance to which the transflective liquid crystal display of each embodiment in FIGS. 1 to 9 is applied; FIG. 9(a) is a perspective view of a cellular phone, FIG. 9(b) is a perspective view of a wrist watch, and FIG. 9(c) is a perspective view of a portable information processing unit;

FIG. 10 shows the polarization axis of a polarizer and the lag axis of a retardation film of the transflective liquid crystal display applied in the embodiment, and the rubbing direction of an upper substrate and the rubbing direction of a lower substrate;

FIG. 11 shows the reflectance of a liquid crystal layer of a reflective display unit with $\Delta nd$ of 0.15 in the transflective liquid crystal display obtained in the embodiment;

FIG. 12 shows the transmissivity of the liquid crystal layer of a transmissive display unit with $\Delta nd$ of 0.29 in the transflective liquid crystal display obtained in the embodiment;

FIG. 13 shows the transmissivity of the liquid crystal layer of the transmissive display unit with $\Delta nd$ of 0.15 in the transflective liquid crystal display obtained in a comparative example;

FIG. 14 shows the reflectance of the liquid crystal layer of the reflective display unit with $\Delta nd$ of 0.29 in the transflective liquid crystal display obtained in the embodiment;

FIG. 15 shows the dependency of the value of (the thickness of the liquid crystal layer of the transmissive display unit/the thickness of the liquid crystal layer of the reflective display unit) on the transmissivity in the transflective liquid crystal display obtained in the embodiment;

FIG. 16 shows the dependency of the value of (the pretilt angle of the reflective display unit—the pretilt angle of the transmissive display unit) on the ratio of (the retardation of the transmissive display unit/the retardation of the reflective display unit) in the transflective liquid crystal display obtained in the embodiment;

FIG. 17 is a cross-sectional view of a first conventional example of the transflective liquid crystal display in accordance with the present invention;

FIG. 18 shows a seventh embodiment of the transflective liquid crystal display in accordance with the present invention;

FIG. 19 shows an eighth embodiment of the transflective liquid crystal display in accordance with the present invention;

FIG. 20 shows a ninth embodiment of the transflective liquid crystal display in accordance with the present invention; and FIG. 21 is a front schematic representation showing the ninth embodiment of the transflective liquid crystal display in accordance with the present invention;

DETAILED DESCRIPTION OF EMBODIMENTS

FIGS. 1 and 2 show a first embodiment with a transflective liquid crystal display in accordance with the present invention applied to an active matrix type liquid crystal display. In the basic structure of a transflective liquid crystal display D according to the first embodiment, a liquid crystal layer 3 is held between substrates 1 and 2 which are disposed facing each other in the vertical direction as illustrated in a cross-sectional structure in FIG. 1 and formed of a transparent glass or the like. Although omitted in the figures, a sealant is actually interposed on peripheral edge sides of the substrates 1 and 2, and the liquid crystal layer 3 is held in a sealed condition between the substrates 1 and 2 by surrounding the liquid crystal layer 3 by the substrates 1 and 2 and the sealant. A backlight 4 is provided on a much lower side of the lower substrate 2 in FIG. 1.

In the transflective liquid crystal display D shown in FIG. 1, a transparent electrode 5 is formed on the liquid crystal layer 3 side of the substrate 1, and a plurality of electrodes 6 rectangular in plan view are formed on the liquid crystal layer 3 side of the substrate 2 separate from each other in the right-to-left direction of the plane of FIG. 1 and in the direction perpendicular to the plane of FIG. 1 corresponding to a display area.

Further, as described in greater detail below, the electrode 6 includes a reflective electrode unit 6a of a rectangular frame in plan view formed of a light reflective metal, and a transparent electrode unit 6c disposed in a through hole 6b formed in a center portion of this reflective electrode unit 6a. In the liquid crystal display D, the display area includes a large number of pixels G in an assembled manner, and each pixel G is demarcated by a square portion having three assembled longitudinal electrodes 6 in plan view of the electrode 6 as shown in FIG. 2. The liquid crystal display D according to the present embodiment is assumed on the color display, and one pixel G square in plan view and demarcated by the three electrodes 6 as specifically shown in FIG. 2 is divided into three divided pixel areas G1, G2 and G3. Individual rectangular through holes 6b are formed in a center portion of the electrodes 6 corresponding to these divided pixel areas G1 to G3, and the transparent electrode units 6c are formed inside these through holes 6b.

More specifically, a recessed portion 2a is formed in an upper surface of the substrate 2 located below the electrode 6 to the position of the through hole 6b, a periphery of a portion having the recessed portion 2a formed therein is formed to be a projecting portion 2b, the transparent electrode 6c is formed on an inner surface of the recessed portion 2b. The reflective electrode unit (a reflective means) 6a includes a light-reflective metal electrode that is formed on an upper surface of the projecting portion 2b, and the reflective electrode unit 6a that is connected in an integrated manner to the transparent electrode unit 6c to constitute the electrode 6. An alignment layer 7 covering these electrodes and peripheral portions thereof is formed on these electrodes 6a and 6c.

The size of the through hole 6b formed in the electrode 6 is substantially a fraction of the length and the width of each divided pixel area to one size of any one of the divided pixel areas G1, G2 and G3. When the substrate 1 is a glass substrate, in order to form the recessed portion 2a, a photolithography process can be achieved, in which a resist is applied on the glass substrate, and then etched using hydrofluoric acid (HF), and the resist is peeled after the etching. Next, a thin film transistor unit 17 as a switching element to drive these electrodes 6 is formed on a corner portion around the electrodes 6, and a gate wire 18 and a source wire 19 to feed the thin film transistor unit 17 of the electrode 6 are provided. In the present embodiment, the thin film transistor unit 17 is provided as the switching element, and a two-terminal type linear element or any switching device of other structure may be provided as the switching element as appropriate.

The thickness of the liquid crystal layer 3 held between the substrates 1 and 2 is formed to be different between a portion corresponding to the recessed portion 2a and a portion corresponding to the projecting portion 2b by forming the recessed portion 2a and the projecting portion 2b in the substrate 2. The relationship to satisfy the inequalities (1) should be preferably maintained between dt and dr, where dt is the thickness of the liquid crystal layer 3 of the area corresponding to the recessed portion 2a, dr is the thickness of the area corresponding to the projecting portion 2b, and $\Delta n$ $(=\Delta n''-\Delta n\perp$: the refractive index in the direction perpendicular to the major axis of the liquid crystal molecule subtracted from the refractive index in the direction parallel to the major axis of the liquid crystal molecule) is the anisotropy of refractive index of the liquid crystal molecule constituting the liquid crystal layer 3.

$$1.8 \times dr \leq dt \leq 2.4 \times dr \quad (1)$$

Next, the relationship between the thickness of the liquid crystal layer (in other words, the gap between the substrates corresponding to the recessed portion 2a between the substrates 1 and 2, or the gap between the substrates corresponding to the projecting portion 2b) dr or dt, and the retardation $\Delta ndr$ or $\Delta ndt$ which is the integrated value of the anisotropy of refractive index should preferably satisfy the inequalities (2).

$$1.8 \times \Delta ndr \leq \Delta ndt \leq 2.4 \times \Delta ndr \quad (2)$$

A color filter 10, an electrode 5 and an alignment layer 11 are laminated on the liquid crystal layer 3 side of the substrate 1 on the side facing the substrate 2.

In the above structure, assuming that the display area of the liquid crystal layer 3 held between the electrode 5 and the electrode 6 forms one divided pixel area, a portion corresponding to the liquid crystal layer 3 of the portion between the electrode 5 and the reflective electrode unit 6a forms a reflective display unit R and a portion corresponding to the liquid crystal layer 3 of the portion between the electrode 5 and the transparent electrode unit 6c forms a transmissive display unit T.

Each colored portion of the color filter 10 is disposed corresponding to the plane position of the divided pixel areas G1, G2 and G3. The color filter 10 includes colored portions 10A, 10B and 10C which are colored to one of "R(Red), G (Green) and B (Blue)", and a light-shading layer (a black matrix) 10a disposed on a boundary portion of these colored portions. Any one of the colored portions of primaries "R(Red), G (Green) and B(Blue)" of the color filter 10 can be disposed in any one of the divided pixel areas G1, G2 and G3, and the light-shading layer 10a of the color filter 10 is disposed on a portion not contributing to the display of a peripheral portion of each divided pixel area. In the structure of the color filter 10 shown in FIG. 1, the colored portions are repeatedly arrayed in the order of the colored layers 10A (red), 10B (green) and 10C (blue), however, the array order of these colored portions is only an example, and any array including random array, mosaic array or arrays of other order may be used without departing from the spirit and scope of the present invention.

A retardation film 12 and a polarizer 13 are disposed on the upper surface side (observer side) of the substrate 1, and similarly, a retardation film 14 and a polarizer 15 are also disposed on the lower surface side of the substrate 2. Only the required number of retardation films and polarizers can be disposed.

Next, the effect and advantage of the transflective liquid crystal display D of the structure shown in FIGS. 1 and 2 will be described below.

In the liquid crystal display D according to the present embodiment, in the reflective mode display, the reflective color display can be achieved by guiding the incident light from the outer side of the substrate 1 to the liquid crystal layer 3 side via the color filter 10, the electrode 5 and the alignment layer 11 making use of the light incident from the outer side of the liquid crystal display. Then reflecting the light by the reflective electrode unit 6a after being transmitted through the alignment layer 7, allowing the light to be transmitted through the liquid crystal layer 3 again, and returning it to the outside of the liquid crystal display via the alignment layer 11, the electrode 5, the color filter 10, the substrate 1, the retardation film 12 and the polarizer 13 to allow the light to reach the viewing person. In this reflective color mode display, the transmissivity of the light transmitted through the liquid crystal layer 3 is changed to enable the bright-and-dark display by controlling the alignment of the liquid crystal of the liquid crystal layer 3 by the electrodes 5 and 6.

In the transmissive mode display, the transmissive color display can be achieved by allowing the light emitted from the backlight 4 to be transmitted through the polarizer 15, the retardation film 14, the substrate 2, the transparent electrode 6c, the alignment layer 7, the liquid crystal layer 3, the alignment layer 11, the electrode 5, the color filter 10, the substrate 1, the retardation film 12 and the polarizer 13 in this order. In this transmissive color mode display, the transmissivity of the light transmitted through the liquid crystal layer 3 is changed to enable the bright-and-dark display by controlling the alignment of the liquid crystal of the liquid crystal layer 3 by the electrodes 5 and 6.

In these mode displays, the incident light is transmitted through the liquid crystal layer 3 twice in the reflective mode display, while the transmitted light emitted from the backlight 4 is transmitted through the liquid crystal layer 3 only once. Considering the retardation of the liquid crystal layer 3, when the alignment is controlled by applying the same voltage from the electrodes 5 and 6, the transmissivity of the liquid crystal becomes different due to the difference in retardation of the liquid crystal between the reflective mode display and the transmissive mode display. However, in the structure according to the present embodiment, the thickness dt of the liquid crystal layer 3 of the transmissive display area to achieve the transmissive display, i.e., a transmissive display unit T corresponding to the transparent electrode unit 6c shown in FIG. 1 is larger than the thickness dt of the liquid crystal layer 3 of a reflective display area, i.e., a reflective display unit R corresponding to the reflective electrode unit 6a shown in FIG. 1, and further, the relationship between dt and dr is set to meet either of the equations (1) and (2). Therefore, the condition of the transmissivity or the reflectance for each voltage as the liquid crystal layer 3 at the reflective display unit R and the transmissive display unit T can be uniform. Accordingly, the brightness of display at the same drive voltage as that in the transmissive display can be set to higher brightness in the transmissive mode display, and the brightness of display at the same drive voltage as that in the reflective display can be set to higher brightness.

More specifically, as clarified in the result of the embodiment with reference to FIGS. 12 and 13 as described below, when the reflective characteristic of the reflective display unit R with $\Delta nd = 0.15$ is compared with the transmissive characteristic of the transmissive display unit T with $\Delta nd = 0.29$, the transmissivity on the higher level or the reflectance on the higher level can be obtained according to the drive voltage. Therefore, the high reflectance can be obtained in the reflective display unit when the drive voltage is zero or low, while the high transmissivity can be obtained at the transmissive display unit, and in general, the brighter display can be obtained not only at the reflective display unit R but also the transmissive display unit T. When the drive voltage is high, the low reflectance can be obtained at the reflective display unit R, and the low transmissivity can be obtained in the transmissive display unit T. In general, a darker display can be obtained not only in the reflective display unit R but also the transmissive display unit T. Accordingly, a display state with high contrast can be obtained not only in the reflective display unit, but also in the transmissive display unit using the structure according to the first embodiment.

FIG. 3 shows a second embodiment in which the transflective liquid crystal display in accordance with the present invention is applied to an active matrix liquid crystal display. Note that the transflective liquid crystal display E according to the second embodiment is substantially identical in structure to that of the transflective liquid crystal display D of the cross-sectional structure shown in FIG. 1, and thus, parts and components identical with those are designated by the same reference symbols, the description thereof is appropriately omitted, and components of different configuration will be mainly explained.

Also, in the transflective liquid crystal display E according to the second embodiment, the basic structure that the liquid crystal layer 3 is held between the substrates 1 and 22 which are disposed facing each other in the vertical direction and formed of a transparent glass, and a backlight 4 is disposed on the lower side of the lower substrate 22.

In the liquid crystal display E according to the second embodiment, a plurality of protruded portions 22b formed of a resin layer such as a photosensitive resin layer of n acrylic resin or the like are formed on an upper surface side of the substrate 22, and recessed portions 22a are formed between the protruded portions 22b. The photosensitive resin may include an acrylic resin or the like with a photosensitive material added thereto. The size and the positional relationship between the recessed portions 22a and the protruded portions 22b are similar to those of the recessed portions 2a and protruded portions 2b in the first embodiment. Thus, the second embodiment is similar to the first embodiment in that an area of the liquid crystal layer 3 corresponding to the recessed portions 22a forms the transmissive display unit T, and an area of the liquid crystal layer 3 corresponding to the protruded portions 22b forms the reflective display unit R.

Next, an upper surface of the liquid crystal layer side of the protruded portions 22b according to the second embodiment is uneven. The surface roughness of the uneven surface is in a range of 0.5 μm to 0.8 μm, and unevenness is formed at random. Since a reflective electrode unit 6a is formed on the uneven surface, a diffusing reflective surface 6e with random unevenness is formed on the reflective electrode unit 6a on the uneven surface. An uneven surface 7e is also formed on an alignment layer 7 covered on the diffusing reflective surface 6e. Other structures are identical to those of the transflective liquid crystal display D according to the first embodiment.

This means that the structure according to the second embodiment is realized by the protruded portions 22b of the resin layer with the unevenness to separate the reflective display unit R from the transmissive display unit T separately formed on the substrate 22 while the unevenness is realized by the recessed portions 2a and the protruded portions 2b directly formed on the substrate 2 in the structure according to the first embodiment, and other structures are identical.

The mode display making use of the transmissive display and the reflective display can by employed in the transflective liquid crystal display E according to the second embodiment similar to that of the liquid crystal display D according to the first embodiment. Regarding the advantage, the thickness of the liquid crystal layer in the transmissive display area is different from that in the reflective display area in a similar manner to the first embodiment, and thus, a similar effect can be obtained.

In addition, in the second embodiment, the diffusing reflective surface 6e having a random unevenness that is formed on the reflective electrode unit 6a, the incident light can be reflective in a diversified direction by the diffusing reflective surface 6e in the reflective mode display, and thus, the reflective display of a high angle of view can be obtained.

To obtain an uneven upper surface of the protruded portions 22b formed of the photosensitive resin layer, for example, a resist of rectangular cross-sectional projection shape is applied thereto, heated and softened, and the protruded portions 22b having an uneven surface can be formed by laminating layers of hemispherical resists thereon.

FIG. 4 shows a transflective liquid crystal display F according to a third embodiment of a structure in which the thickness of the liquid crystal layer is different for each display area in the reflective display unit and the transmissive display unit. Note that parts and components in the structure according to the third embodiment identical with those of the transflective liquid crystal display D according to the first embodiment are designated by the same reference symbols, and the description thereof is appropriately omitted.

Also, in the transflective liquid crystal display F according to the third embodiment, the basic structure with the liquid crystal layer 3 held between the substrates 31 and 32 which are disposed facing each other in the upper and lower direction and formed of a transparent glass is identical, and the backlight 4 is disposed on a lower side of the lower substrate 32.

In the transflective liquid crystal display F according to the third embodiment, an upper surface of one (lower) substrate 32 shown in FIG. 4 is formed flat, and a plurality of electrodes 36 rectangular in plan view are neatly arranged on the flat substrate 32 corresponding to the display area. These electrodes 36 are of a flat structure identical to that of the electrode 6 explained with reference to FIG. 2, and include a metal reflective electrode unit 36a of a rectangular frame shape in plan view and a transparent electrode part 36c of rectangular shape in plan view formed in a through hole 36b opened in a center portion of the reflective electrode unit 36a, however, the electrode 36 is of one-layer structure, which is different from that in the first embodiment. An uneven surface is formed on the upper surface side of the reflective electrode unit 36a to form a diffusing reflective surface 36e.

In addition, recessed portions 31a are formed on the surface of the liquid crystal layer side of the upper substrate 31 corresponding to a portion with the transparent electrode unit 36c formed thereon, and portions corresponding to the portion with the reflective electrode unit 36a formed thereon are formed on the protruded portions 31b, and an electrode 35 formed on the surface on the liquid crystal layer side of the upper substrate 31 is formed unevenly while a recessed portion of each electrode 35 is aligned with the transparent electrode unit 36c.

The thickness dr of the liquid crystal layer 3 of the reflective display unit R (the portion corresponding to the reflective electrode unit 36a) and the thickness dt of the liquid crystal layer 3 of the transmissive display unit (the portion corresponding to the transmissive electrode unit 36c) T are in the relationship to satisfy the equation (1) that is identical to that for the structure according to the first embodiment. The relationship between Δndr and Δndt also satisfies equation (2) that also identical to that for the structure according to the first embodiment.

Further described in detail, in the transflective liquid crystal display F, the display area includes a large number of aggregated pixels, and each pixel is constituted for an area corresponding to the electrode 36 in the transflective liquid crystal display F according to the present embodiment in a similar manner that the pixel is demarcated by the portions corresponding to the electrode 6 in the structure shown in FIG. 2. Since the liquid crystal display F according to the present embodiment is of a structure assuming the color display, one pixel G of a square shape in plan view which is specifically demarcated in FIG. 2 is divided into three divided pixel areas G1, G2 and G3 corresponding to the three electrodes 36 similar to the first embodiment. Rectangular through holes 36b are individually formed in a center portion of the electrode 36 corresponding to these divided pixel areas G1 to G3. The transparent electrode units 36c are formed inside the through holes 36b, and the reflective electrode unit 36a and the transparent electrode unit 36c are integratedly connected to each other to constitute the electrode 36.

Also, in the transflective liquid crystal display F according to the third embodiment, a mode display making use of the transmissive display and the reflective display can be employed in a similar manner to that of the liquid crystal display D according to the first embodiment. Regarding the advantage, similar effect can be obtained since the relationship of the thickness of the liquid crystal layer between the transmissive display area and the reflective display area agrees with the formula identical to that according to the first embodiment.

In addition, in the third embodiment, the diffusing reflective surface 36e having random unevenness is formed on the reflective electrode unit 36a. The incident light can be reflected in a diversified direction by the diffusing reflective surface 36e in the reflective mode display, and thus, the reflective display of a high angle of view can be obtained.

FIG. 5 shows a transflective liquid crystal display G according to a fourth embodiment having the structure to change the pretilt angle of the liquid crystal for each display area in the reflective display area and the transmissive display area. Parts and components identical with those of the transflective liquid crystal display F according to the third embodiment are designated by the same reference symbols in the structure of the fourth embodiment, and the description thereof is appropriately omitted.

The structure of the transflective liquid crystal display G according to the fourth embodiment is different from the structure that the recessed portions 31a are provided within the upper substrate 31 according to the third embodiment, and the liquid crystal layer 3 is held by the upper substrate 1 according to the first embodiment and the lower substrate 32 according to the third embodiment, and no recessed portions are provided in the upper substrate 1 similar to the structure according to the first embodiment.

The pretilt angle of the liquid crystal in the area corresponding to the reflective display unit R is set to be larger than the pretilt angle of the liquid crystal in the area corresponding to the transmissive display unit T. For example, an inequality θt>θr is satisfied, where θr is the pretilt angle of the liquid crystal molecule (illustrated by a long ellipse in FIG. 5) in the area corresponding to the reflective display unit R in FIG. 5, and θt is the pretilt angle of the liquid crystal molecule in the area corresponding to the transmissive display unit T.

Further, in this relationship, the relationship of the inequalities $30° \leq θr-θt \leq 50°$ (3) is more preferable.

This is attributable to the fact that the relationship shown in the equation (4) below is present between the anisotropy refractive index Δn of the liquid crystal and the pretilt angle θ of the liquid crystal.

$$\Delta n(\theta) = \{(n''\cdot n\perp)/(n^{2''}\cdot \sin^2\theta + n^2\perp\cdot\cos^2\theta)^{1/2}\} - n\perp \quad (4)$$

According to the equation (4), when the pretilt angle of the liquid crystal is increased, the double refraction is decreased, and it is clear that Δn can be controlled by increasing the pretilt angle at the reflective display unit and decreasing the pretilt angle at the transmissive display unit.

Thus, the transmissivity of the reflective display unit R and the transmissive display unit T can be set to those similar to the previous embodiment by controlling the double refraction of the liquid crystal of the reflective display unit R and the liquid crystal of the transmissive display unit T by employing the structure shown in FIG. 5, and the object of the present invention can be achieved.

FIG. 6 shows a transflective liquid crystal display J according to the fifth embodiment having the structure to improve the Δndt of the transmissive display unit T compared with the Δndr of the reflective display unit R at the reflective display unit R and the transmissive display unit T. The display includes a retardation layer 36d formed of a polymer liquid crystal layer or the like is laminated in the through hole 36b in the reflective electrode unit 36 in addition to the transparent electrode unit 36c. The retardation is controlled by allowing the transmitted light generated by the backlight 4 to be transmitted through the retardation layer 36d.

The position for forming the retardation layer 36d disposed to control the retardation of the transmitted light may be determined after the transmitted light is generated from the backlight 4 and transmitted through the polarizer 15 and the retardation film 14 on the substrate 32 side, and before the transmitted light is transmitted through the retardation film 12 and the polarizer 13 on the substrate 1 side. As illustrated by a two-dot chain line in FIG. 6, a retardation layer 50 may be built in the upper substrate 1.

Thus, the transmissivity of the liquid crystal of the reflective display unit R and that of the transmissive display unit T can be simultaneously controlled in a similar manner to the previous embodiments. In other words, by controlling the retardation of the liquid crystal of the reflective display unit R and that of the liquid crystal of the transmissive display unit T by employing the structure shown in FIG. 6, and the object of the present invention can be achieved thereby.

The above-described liquid crystal displays D, E, F, G and J are the embodiments in which the present invention is applied to active matrix liquid crystal displays. However, it is to be understood that the present invention may also be applied to passive matrix liquid crystal displays. The embodiments in which the present invention is applied to passive matrix liquid crystal displays will be described below.

FIGS. 7 and 8 show the sixth embodiment in which a transflective liquid crystal display in accordance with the present invention is applied to a passive matrix liquid crystal display. The transflective liquid crystal display K according to the sixth embodiment is similar to each previous embodiment in the basic structure where the liquid crystal layer 3 is held between the substrates 1 and 20 which are of a cross-sectional structure shown in FIG. 7, disposed facing each other in the vertical direction and formed of a transparent glass or the like, and the backlight 4 is disposed on the much lower side of the lower substrate 20 in FIG. 7.

In the transflective liquid crystal display K shown in FIG. 7, the transparent electrodes 50 of a strip shape in plan view are formed on the liquid crystal layer 3 side of the substrate 1 in an extending manner perpendicular to the plane of FIG. 7 corresponding to the display area separate from each other in the right-to-left direction of the plane of FIG. 7. A plurality of electrodes 60 of a strip shape in plan view are formed on the liquid crystal layer 3 side of the substrate 20 in an extending manner in the right-to-left direction of the plane of FIG. 7 corresponding to the display area separated from each other perpendicular to the plane of FIG. 7. Further, the upper and lower electrodes 50 and 60 are disposed across each other at 90° in plan view. The electrode 60 includes a reflective electrode unit 60a formed of a light-reflective metal and a transparent electrode unit 60c disposed in a through hole 60b formed in a part of the reflective electrode unit 60a.

The display area in the transflective liquid crystal display K comprises a large number of aggregated pixels. As shown in FIG. 8 when electrodes 50 and 60 are in plan view, each pixel is demarcated by the intersecting part of electrode 50 and electrode 60. The liquid crystal display in accordance with the present invention is of the structure assuming the color display, and more specifically, one pixel G of a square shape in plan view demarcated by the chain line shown in FIG. 8 is demarcated by intersections of the three electrodes 50 and one electrode 60. The one pixel G is divided into divided pixel areas G1, G2 and G3 to be demarcated by one electrode 50 and one electrode 60. Individual rectangular through holes 60b are formed in a center portion of the electrode 60 corresponding to these divided pixel areas G1 to G3, and the transparent electrode unit 60c is formed inside the through hole 60b. More specifically, recessed portions 20a are formed on the upper surface of the substrate 20 located below the electrode 60 at the position corresponding to the through hole 60b, a periphery of a portion with the recessed portions 20a formed thereon are formed the protruded portions 20b, the transparent electrode unit 60c is formed on an inner surface of the recessed portions 20b, the reflective electrode unit 60a including the light reflective metal electrode is formed on the upper surface of the protruded portions 20b, and the reflective electrode unit 60a is integratedly connected to the transparent electrode unit 60c to constitute the electrode 60. An alignment layer 70 covering the electrodes 60a and 60c and the periphery thereof is formed on the electrodes. The size of the through hole 60b formed in the electrode 60 is substantially a fraction of the length and the width of each divided pixel area to the size of any one of the divided pixel areas G1, G2 and G3.

In a structure corresponding not to the color display like the present embodiment, but to the monochrome display, the electrodes 50 and 60 are of a strip shape of the same width, and the color filter described below may be omitted.

By forming the recessed portions 20a and the protruded portions 20b in the substrate 20, the thickness of the liquid crystal layer 3 held between the substrates 1 and 20 is different in a portion corresponding to the recessed portions 20a and the protruded portions 20b. The relationship between dt and dr preferably satisfies the equations (1) and (2), where dt is the thickness of the liquid crystal layer 3 corresponding to the recessed portions 20a, dr is the thickness of the area corresponding to the protruded portions 20b, and Δn is the anisotropy of refractive index of a nematic liquid crystal constituting the liquid crystal layers 3 (=Δn"– Δn⊥: the value of the refractive index of the liquid crystal molecule in the direction perpendicular to the major axis subtracted from the value of the refractive index of the liquid crystal molecule in the direction parallel to the major axis of the liquid crystal molecule).

On the other hand, the color filter 10, the electrode 50 and the alignment layer 11 are laminated on the liquid crystal layer 3 side of the substrate 1 on the side facing the substrate 20. The electrode 50 is disposed in an intersecting manner with the electrode 60 as described with reference to FIG. 8. The width of the electrode 50 is formed to be about one third of the width of the electrode 60, or slightly smaller than that value in this embodiment. However, the shape and the width of the electrode are not limited to the shape and the width shown in FIG. 8.

In the above structure, when the display area of the liquid crystal layer 3 of a square shape in plan view surrounded by three electrodes 50 and one electrode 60 is assumed to be one pixel, a portion corresponding to the liquid crystal layer 3 of a portion between one electrode 50 and the reflective electrode unit 60a of one electrode 60 is formed to be the reflective display unit R and a part corresponding to the liquid crystal layer 3 of a portion between one electrode 50 and the transparent electrode unit 60c of one electrode 60 is formed to be the transmissive display unit T.

Each colored portion of the color filter 10 is disposed corresponding to the plane position of the divided pixel areas G1, G2 and G3. The color filter 10 comprises the colored portions 10A, 10B and 10C colored to any one of "R(Red), G(Green) and B(Blue)". A light-shading layer (black matrix) 10a is disposed on boundary portions of these colored portions, and thus, any one of the colored portions of the primaries "R(Red), G(Green) and B(Blue)" of the color filter 10 are disposed in any one of the divided pixel areas G1, G2 and G3, and the light-shading layer 10a of the color filter 10 is disposed on a portion not contributing to the display of a peripheral portion of each divided pixel area.

Both the retardation film 12 and the polarizer 13 are disposed on the upper surface side (a viewing person side) of the substrate 1. Also, both the retardation film 14 and the polarizer 15 are disposed on the lower surface side of the substrate 20. Only the required number of retardation films and polarizers can be disposed.

Next, the operating effect of the transflective liquid crystal display K of the structure shown in FIGS. 7 and 8 will be described below.

In the liquid crystal display K according to the present embodiment, in the reflective mode display, the light incident from the external side of the liquid crystal display is used. This incident light is guided from the external side of the substrate 1 to the liquid crystal layer 3 via the color filter 10, the electrode 50, and the alignment layer 11, transmitted through the alignment layer 70, reflected by the reflective electrode unit 60a, transmitted through the liquid crystal layer 3 again, and returned to the outside of the liquid crystal display via the alignment layer 11, the electrode 50, the color filter 10, the substrate 1, the retardation film 12 and the polarizer 13. The light reaches the viewing person to achieve the reflective color display.

In the transmissive mode display, the light generated from the backlight 4 is transmitted through the polarizer 15, the retardation film 14, the substrate 20, the transparent electrode 60c, the alignment layer 70, the liquid crystal layer 3, the alignment layer 11, the electrode 50, the color filter 10, the substrate 1, the retardation film 12, and the polarizer 13 in this order to achieve the transmissive color display.

In these mode displays, the thickness dt of the liquid crystal layer 3 of the transmissive display unit T is set to be larger than the thickness dr of the liquid crystal layer 3 of the reflective display unit R, and dt and dr are set to the relationship to meet any one of the equation (1) and (2). The state of the transmissivity or the reflectance for each voltage as the liquid crystal layer 3 at the reflective display unit R and the transmissive display unit T can be set to be an ideal state. Thus, the excellent display brightness at the same drive voltage in the transmissive mode display and the excellent display brightness at the same drive voltage in the reflective mode display can be compatibly realized. Thus, the display state with high contrast can be obtained not only at the reflective display unit but also the transmissive display unit can be obtained by the structure of the sixth embodiment in a similar manner to the first embodiment.

FIG. 18 shows the seventh embodiment in which the transflective liquid crystal display in accordance with the present invention is applied to an active matrix liquid crystal display.

Also, in the transflective liquid crystal display according to the seventh embodiment, the basic structure where a liquid crystal layer 1808 is held between substrates 1803 and 1817 which are disposed facing each other in the vertical direction and formed of a transparent glass or the like is identical to that of other above-described embodiments, and a backlight is disposed on the lower side of the lower substrate 1817. A polarizer 1801 and a retardation film 1802 are disposed on an outer surface of the upper substrate 1803, and a color filter 1804 having R(Red), G(Green) and B(Blue), a protective film 1805 formed of a transparent acrylic resin, a transparent electrode 1806, and an alignment layer 1807 are successively formed on an inner surface. On the other hand, a reflective electrode 1811 having an uneven structure, a transparent electrode 1810, and an alignment layer 1809 are formed on the inner surface of the liquid crystal layer 1808 of the lower substrate 1817, and a retardation film 1812 and a polarizer 1813 are disposed on an outer surface on the backlight side. The backlight includes a light source 1815, a light guide plate 1814, etc.

In the liquid crystal display according to the seventh embodiment, the protective layer 1805 including a resin layer such as a photosensitive resin layer of acrylic resin or the like is formed entirely except the transmissive display unit on the inner surface side of the substrate 1803, and recessed portions are formed in the transmissive display unit. An acrylic resin with a photosensitive material added thereto can be applied as the photosensitive resin used for the protective film 1805. The size and the positional relationship of the recessed portions are identical to those in the first embodiment. Thus, an area of the liquid crystal layer 1808 corresponding to the recessed portions is formed to be the transmissive display unit T, and an area of the liquid crystal layer 1808 corresponding to the protruded portions is formed to be the reflective display unit R in an identical manner to that according to the first embodiment.

FIG. 19 shows the eighth embodiment in which the transflective liquid crystal display in accordance with the present invention is applied to active matrix liquid crystal display.

Also, in the transflective liquid crystal display according to the eighth embodiment, the basic structure that a liquid crystal layer 1908 is held between substrates 1903 and 1917 which are disposed facing each other in the vertical direction and formed of a transparent glass or the like is identical to that of other above-described embodiments, and a backlight is disposed on the lower side of the lower substrate 1917. A polarizer 1901 and a retardation film 1902 are disposed on an outer surface of the upper substrate 1903, and a transparent electrode 1906 and an alignment layer 1907 are successively formed thereon. Further, a reflector 1911 having an uneven structure, a color filter 1904 comprising R(Red), G(Green) and B(Blue), a protective film 1905 formed of a transparent acrylic resin, a transparent electrode 1910, and an alignment layer 1909 are successively formed on an inner surface on the liquid crystal layer 1908 side on the lower substrate 1917, and a retardation film 1912 and a polarizer 1913 are disposed on an outer surface on the backlight side. The backlight comprises a light source 1915, a light guide plate 1914, etc.

In the liquid crystal display according to the eighth embodiment, the protective layer 1905 including a resin layer such as a photosensitive resin layer of acrylic resin or the like is formed entirely except the transmissive display unit on the inner surface side of the substrate 1917, and recessed portions are formed in the transmissive display unit. An acrylic resin with a photosensitive material added thereto can be applied as the photosensitive resin used for the protective film 1905. The size and the positional relationship of the recessed portions are identical to those in the first embodiment. Thus, an area of the liquid crystal layer 1908 corresponding to the recessed portions is formed to be the transmissive display unit T, and an area of the liquid crystal layer 1908 corresponding to the protruded portions is formed to be the reflective display unit R in an identical manner to that according to the first embodiment.

Further, in the liquid crystal display of the eighth embodiment, both the reflective display unit and the transmissive display unit of the transparent electrode 1910 on the inner surface of the substrate 1917 are formed of the same material, i.e., ITO. The transparent electrode 1906 on the inner surface of the substrate 1903 is also formed of the same material, i.e., ITO as that of the transparent electrode 1910 on the inner surface of the substrate 1917.

FIG. 20 shows the ninth embodiment in which the transflective liquid crystal display in accordance with the present invention is applied to active matrix liquid crystal display.

Also, in the transflective liquid crystal display according to the ninth embodiment, the basic structure that a liquid crystal layer 2008 is held between substrates 2003 and 2017 which are disposed facing each other in the vertical direction and formed of a transparent glass or the like is identical to that of other above-described embodiments, and a backlight is disposed on the lower side of the lower substrate 2017. A polarizer 2001 and a retardation film 2002 are disposed on an outer surface of the upper substrate 2003, and a color filter 2004 comprising R(Red), G(Green) and B(Blue), a protective film 2005 formed of a transparent acrylic resin, a transparent electrode 2006, and an alignment layer 2007 are successively formed on an inner surface. On the other hand, a reflector 2011 having an uneven structure, an insulating film 2016 formed of $SiO_2$, a transparent electrode 2010 and an alignment layer 2009 are formed on an inner surface on the liquid crystal layer 2008 side on the lower substrate 2017, and a retardation film 2012 and a polarizer 2013 are disposed on an outer surface on the backlight side. The backlight comprises a light source 2015, a light guide plate 2014, etc.

In the liquid crystal display according to the ninth embodiment, both the reflective display unit and the transmissive display unit of the transparent electrode 2010 on the inner surface of the substrate 2017 are formed of the same material, i.e., ITO. The transparent electrode 2006 on the inner surface of the substrate 2003 is also formed of ITO, i.e., the same material as that of the transparent electrode 2010 on the inner surface of the substrate 2017.

FIG. 21 is a front schematic representation of the lower substrate 2017 used in the transflective liquid crystal display in FIG. 20. A thin film transistor (TFT) element 2101, a gate wire 2102, a signal wire 2103, a reflective display unit 2104, a transmissive display unit 2105, etc. are formed on the substrate 2017. The alignment layer formed on this substrate is subjected to the alignment 2106 by the rubbing method in the longitudinal direction of the transmissive display unit 2105.

Next, specific examples of electric appliances provided with any one of the transflective liquid crystal displays D, E, F, G and J according to the first to sixth embodiments will be described below.

FIG. 9(*a*) is a perspective view showing an example of a cellular phone. In FIG. 9(*a*), numeral 200 denotes a cellular phone body, and numeral 201 denotes a liquid crystal display unit using any one of the above transflective liquid crystal displays D, E, F, G, H and J.

FIG. 9(*b*) is a perspective view showing an example of a wrist watch type electronic appliance. In FIG. 9(*b*), numeral 400 denotes a watch body, and numeral 401 denotes a liquid crystal display unit using any one of the above transflective liquid crystal displays D, E, F, G, H and J.

FIG. 9(*c*) is a perspective view showing an example of a portable information processor such as a word processor and a personal computer. In FIG. 9(*c*), numeral 300 denotes an information processor, numeral 301 denotes an input unit such as a keyboard, numeral 303 denotes an information processor body, and numeral 302 denotes a liquid crystal display unit using any one of the above transflective liquid crystal displays D, E, F, G, H and J.

The electronic appliances shown in FIGS. 9(*a*) to 9(*c*) are provided with the liquid crystal display unit using any one of the transflective liquid crystal displays D, E, F, G and J, and have advantages of any one of the transflective liquid crystal displays D, E, F, G and J of the above-described first to sixth embodiments. Therefore, the electronic appliances are provided with the liquid crystal display unit possible for the transmissive display and the reflective display with high contrast and excellent display quality even when using any one of the transflective liquid crystal displays D, E, F, G and J.

A liquid crystal cell holding a nematic liquid crystal with positive anisotropy dielectric constant was assembled between the glass substrates 1 and 2 facing each other. An entire area electrode formed of ITO was formed on the liquid crystal layer side of the upper glass substrate. In addition, a polyimide alignment layer was formed thereon. A large number of pixel electrodes having uneven portions of a cross-sectional structure or a flat structure, and the transparent electrode unit and the reflective electrode unit shown in FIGS. 1 and 2 were formed on the liquid crystal layer side of the lower glass.

On the lower glass substrate, 320×3 rectangular recessed portions with a length of 100 μm in plan view and with a width of 20 μm in plan view were etched (320×3 pieces for a GVGA panel, or 640×3 pieces for a VGA panel) with a spacing of 50 μm, a transparent electrode units formed of ITO was formed on the inner surface of the recessed portions, and the reflective electrode unit formed of an Al thin film rectangular in plan view shown in FIG. 2 was formed so that the periphery of the transparent electrode units are respectively covered. A thin film transistor circuit was formed in order to drive the electrode including the transparent electrode unit and the reflective electrode unit. Further, the rubbing direction of the alignment layer of the upper substrate 1 and the rubbing direction of the alignment layer of the lower substrate were set to be the anti-parallel direction different by 180° (in FIG. 10, the rubbing direction of the alignment layer of the upper substrate is defined as the +y direction, while the rubbing direction of the alignment layer of the lower substrate is defined as the −y direction).

In the liquid crystal cell of the above configuration, the double refraction $\Delta n$ of the liquid crystal of the reflective display unit, d, and the retardation value $\Delta nd$ were set to be 0.05, 3.0 μm, and 150 nm, respectively, while the double refraction $\Delta n$ of the liquid crystal of the transmissive display unit, d, and the retardation value $\Delta nd$ were set to be 0.05, 5.8 μm, and 290 nm, respectively, Next, as shown in FIG. 10, two retardation films 12 and one polarizer 13 were laminated on the upper substrate, while two retardation films 14 and one polarizer 15 were laminated under the lower substrate, and the backlight was installed thereon. The angle of inclination θ1 of the axis of transmission of the upper polarizer 13 was set to be 15° with respect to X-axis parallel to the X-direction as shown in FIG. 11. The angle of inclination θ2 of the axis of lag of the first retardation film 12 was set to be 30° with respect to X-axis, the retardation value ($\Delta nd$) was set to be 260 nm. The angle of inclination θ3 of the axis of lag of the second retardation film 12 was set to be 90° with respect to X-axis, and the retardation value ($\Delta nd$) was set to be 110 nm. The angle of inclination θ4 of the axis of lag of the first retardation film 14 disposed on the lower substrate 2 side was set to be 45°, and the retardation value was set to be 14 nm. The angle of inclination θ5 of the axis of lag of the second retardation film 14 was set to be 75°, and the retardation value was set to be 270 μm. The angle of inclination θ6 of the axis of transmission of the polarizer 15 was set to be 40°.

FIG. 11 shows the result of measurement of the reflectance to the drive voltage at the reflective display unit ($\Delta nd$=150 nm=0.15 μm), and FIG. 12 shows the result of measurement of the transmissivity to the drive voltage at the transmissive display unit ($\Delta nd$=290 nm=0.29 μm) when using the liquid crystal cell of the above configuration. From the relationship shown in these figure, it is clearly shown that the high reflectance or transmissivity exceeding 95% is realized when the drive voltage is low at both the reflective display unit of the structure with $\Delta nd$ of 0.15 μm and the transmissive display unit of the structure with $\Delta nd$ of 0.29 μm, and the low reflectance or transmissivity of approximately 1% or under close to zero is realized when the drive voltage is 4V to 5V.

From the above findings, the mode display to satisfy the high reflectance at the reflective display unit and the high transmissivity at the transmissive display unit can be obtained at the voltage under the same driving condition if $\Delta nd$ of the reflective display unit and the transmissive display unit of the liquid crystal cell is controlled.

Next, for comparison, FIG. 13 shows the result of the measurement of the transmission characteristic of the transmissive display unit in the liquid crystal cell with the electrode thereof including the reflective electrode unit and the transparent electrode unit without forming any recessed portions in the glass substrate was assembled with $\Delta nd$ set to a predetermined value of 0.15 μm (150 nm). FIG. 14 shows the result of the measurement of the reflective characteristic of the reflective display unit in the liquid crystal cell with the electrode thereof including the reflective electrode unit and the transparent electrode unit without forming any recessed portions in the glass substrate was assembled with $\Delta nd$ set to a predetermined value of 0.29 μm (290 nm).

The result in FIG. 13 shows that the transmission characteristic of the transmissive display unit was extremely dark as the liquid crystal display when $\Delta nd$ is set to be 0.15 μm (150 nm), and the transmissivity below 30% was shown. Next, the result in FIG. 14 shows that, when $\Delta nd$ was set to 0.29 μm (290 nm), reflectance of the reflective display unit was unstable and reflectance on the low voltage side was poor. With a darker display, at a drive voltage of 2 to 3 V, transmissivity was high and the display bright, but at a drive voltage of 4 to 5 V, transmissivity again became low and the display dark. Thus, as reflectance changed in three levels, it is shown that these characteristics are not suitable for use as a liquid crystal display.

As explained above, it is clear from the results in FIGS. 11 to 14 that it is possible to obtain a liquid crystal display excellent in both reflectance and transmissivity and able to achieve a bright display under the low voltage driving condition in the range of 0V to 1.4V, and low in reflectance and transmissivity and with exceptional dark display under the high voltage driving condition in the range of 4V to 5V so long as the liquid crystal display has a structure having a reflective display unit with $\Delta nd$ of 0.15 μm (150 nm) and a transmissive display unit with $\Delta nd$ of 0.29 μm (290 nm).

FIG. 15 shows the result of the relationship between the ratio (dt/dr) of the thickness of the liquid crystal layer of the transmissive display unit to the thickness of the liquid crystal display of the reflective display unit and the transmissivity when using a plurality of liquid crystal cells of the same configuration as the above embodiments, changing the cell gap at each liquid crystal cell, and appropriately changing the thickness of the liquid crystal layer.

FIG. 15 clearly shows that the ratio (dt/dr) is preferably not less than 1.6 and not more than 2.6 if the transmissivity is not less than 80%, i.e., in order to obtain the bright display in the liquid crystal display of the liquid crystal cells. FIG. 16 also clearly shows that the above ratio is preferably not less than 1.8 and not more than 2.4 in order to obtain transmissivity of not less than 90% as transmissivity to obtain the brighter display, or the ratio is necessary to be not less than 1.9 and not more than 2.3 in order to obtain the brightest display with transmissivity of not less than 95%.

Further, in FIG. 16, it can be considered that employment of the ratio of (dt/dr) is equivalent to employment of the ratio of Δnd of each structure of the transmissive display unit T and the reflective display unit R, and the previously limited numerical ranges in the equations (1) and (2) can be demonstrated.

Next, the liquid crystal cell of the structure shown in FIG. 5 was assembled. In this liquid crystal cell, the polarizer, the retardation film and the upper glass substrate were the same as those in the liquid crystal cell of the above embodiments. However, a flat glass substrate was used without forming any recessed portions in the lower substrate. The shapes in plan view of the transmissive electrode unit and the reflective electrode unit of the lower substrate were identical to those of the liquid crystal cell of the above embodiments, and the size of each portion was set to be identical to that of the above embodiments so that the shape of the electrodes is that shown in the plan view of FIG. 2. However, an alignment layer of homeotropic alignment (for example, JALS-204: trade name of JSR Co., Ltd.) was used in the portion corresponding to the area on the reflective electrode unit for the alignment layer disposed on the upper substrate and that disposed on the lower substrate so that the pretilt angle of the liquid crystal is 45°, and an alignment layer of homogeneous alignment (for example, AL-1254: trade name of JSR Co., Ltd.) was used in the portion corresponding to the area on the transmissive electrode unit so that the pretilt angle of the liquid crystal is 1°. These alignment layers can be manufactured by the method disclosed in, for example, Japanese Unexamined Patent Application Publication No. 5-210099.

FIG. 16 shows the result of the measurement of the relationship between the pretilt angle of the liquid crystal of the transmissive display unit subtracted from that of the reflective display unit for the obtained liquid crystal cell and the ratio (the retardation of the transmissive display unit/the retardation of the reflective display unit).

From the result shown in FIG. 16, it is clear that it is possible to control the retardation in a range of not less than 1.4 to not more than 2.5 in which the substantially excellent display characteristic can be obtained if the differential pretilt angle is set in the range between 30° and 50° for the difference in the pretilt angle of each liquid crystal between the reflective display unit and the transmissive display unit.

As described above, the liquid crystal display in accordance with the present invention can arrange the transmissivity of the liquid crystal of the area in the reflective mode and the transmissivity of the liquid crystal in the area in the transmissive mode, and maintain the display state with high contrast in both the reflective display unit and the transmissive display unit if the thickness of the liquid crystal layer of the reflective display unit and that of the transmissive display unit are set so that the inequalities of $1.8\, dh \leq dt \leq 2.4\, dh$ are satisfied, where dh is the thickness of the liquid crystal layer corresponding to the reflective display unit and dt is the thickness of the liquid crystal layer corresponding to the transmissive display unit in the structure of the transflective liquid crystal display.

In order to obtain the display state of such a high contrast, the inequalities of $1.8\, \Delta nd \leq \Delta ndt \leq 2.4\, \Delta ndh$ may be satisfied, where Δn is the anisotropy of refractive index of the nematic liquid crystal, Δndh is the product of the anisotropy of refractive index by the thickness dh of the liquid crystal layer of the reflective display unit, and Δndt is the product of the anisotropy of refractive index by the thickness dt of the liquid crystal layer of the transmissive display unit.

In addition, if the thickness of the liquid crystal layer is changed at the reflective display unit and the transmissive display unit, a structure in which recessed portions corresponding to the transmissive display unit are formed on the liquid crystal layer side of the substrate on the side without no reflective means.

The object of the present invention may be achieved by setting the pretilt angle of the liquid crystal layer in the range of 30° and 50° in the difference in the pretilt angle of the liquid crystal between the reflective display unit and the transmissive display unit in place of the change of the thickness of the liquid crystal layer at the reflective display unit and the transmissive display unit, and the display state with high contrast can be obtained at both the reflective display unit and the transmissive display unit.

A structure in which recessed portions are formed only in the transmissive display unit can be employed by forming no transparent protective film on the color filter on the portion corresponding to the transmissive display unit.

Since the boundary between the transmissive display unit and the reflective display unit is continuously connected via a transparent electrode of the same material, the boundary portion has a gentle slope, the defective alignment generated in a step between the reflective display unit and the transmissive display unit can be suppressed to a minimum, and both the reflective display unit and the transmissive display unit can be maintained in the display state with high contrast.

The transmissive display unit is rectangular in shape, and the longitudinal direction of the rectangular shape is substantially parallel to the alignment direction of the alignment layer of the liquid crystal, and the defective alignment generated in the step between the reflective display unit and the transmissive display unit can be suppressed to a minimum, and the display state with high contrast can be maintained at the reflective display unit and the transmissive display unit.

In addition, in the electronic appliance having the liquid crystal display in accordance with the present invention, both the transmissive mode display and the reflective mode display can be effectively used, and the contrast of the display is high.

While this invention has been described in conjunction with specific embodiments thereof, it is evident that many alternatives, modifications, and variations will be apparent to those skilled in the art. Accordingly, preferred embodiments of the invention as set forth herein are intended to be illustrative not limiting. Various changes may be made without departing from the spirit and scope of the invention.

What is claimed is:

1. A liquid crystal display, comprising:
   a first substrate;
   a second substrate facing the first substrate;
   a liquid crystal layer in between the first and second substrates;
   a first color filter in a first color;
   a second color filter in a second color different from the first color, the second color filter having a surface in direct contact with a surface of the first color filter at a boundary between the first color filter and the second color filter;
   a reflective section formed in between the second substrate and the liquid crystal layer;
   a transmissive section adjacent to the reflective section;

a layer formed over the first substrate at a position between the liquid crystal layer and the boundary, the layer being located at the reflective section and making thickness of the liquid crystal layer thinner at the reflective section than at the transmissive section.

2. A liquid crystal display, comprising:

a first substrate;

a second substrate facing the first substrate;

a liquid crystal layer in between the first and second substrates;

a first color filter in a first color;

a second color filter in a second color different from the first color, the second color filter having a surface in direct contact with a surface of the first color filter at a boundary between the first color filter and the second color filter;

a reflective section formed in between the second substrate and the liquid crystal layer;

a transmissive section adjacent to the reflective section; and a layer formed over the first substrate at a position in between the liquid crystal layer and the boundary between the first color filter and the second color filter, the layer having a surface facing the liquid crystal, the surface including:

a recessed portion that faces the liquid crystal layer at a position corresponding to the transmissive section; and a protruding portion at a position corresponding to the reflective section so that the liquid crystal layer has a greater thickness at the transmissive section than at the reflective section.

3. The liquid crystal display as claimed in claim 1, wherein the reflective section has an uneven surface facing the liquid crystal layer.

4. The liquid crystal display as claimed in claim 1, further comprising a polarizer at a side of the first substrate opposite from the liquid crystal layer.

5. The liquid crystal display as claimed in claim 1, further comprising a polarizer at a side of the second substrate opposite from the liquid crystal layer.

6. The liquid crystal display as claimed in claim 1, further comprising a retardation layer at a side of the first substrate opposite from the liquid crystal layer.

7. The liquid crystal display as claimed in claim 1, further comprising a retardation layer at a side of the second substrate opposite from the liquid crystal layer.

8. The liquid crystal display as claimed in claim 1, further comprising an illumination unit disposed at an opposite side of the second substrate than the liquid crystal layer.

9. A liquid crystal display as claimed in claim 2, further comprising a switching element disposed in between the second substrate and the liquid crystal layer.

\* \* \* \* \*